United States Patent
Paul

(10) Patent No.: US 10,062,254 B1
(45) Date of Patent: Aug. 28, 2018

(54) INTRUSION DETECTION SYSTEM

(71) Applicant: Alexander Paul, Arroyo Grande, CA (US)

(72) Inventor: Alexander Paul, Arroyo Grande, CA (US)

( * ) Notice: Subject to any disclaimer, the term of this patent is extended or adjusted under 35 U.S.C. 154(b) by 0 days.

(21) Appl. No.: 15/478,142

(22) Filed: Apr. 3, 2017

(51) Int. Cl.
*G08B 13/18* (2006.01)
*G08B 13/184* (2006.01)
*G01V 8/14* (2006.01)
*G01J 1/44* (2006.01)
*G01J 1/02* (2006.01)

(52) U.S. Cl.
CPC .......... *G08B 13/184* (2013.01); *G01J 1/0228* (2013.01); *G01J 1/44* (2013.01); *G01V 8/14* (2013.01)

(58) Field of Classification Search
CPC ...... G01S 13/0209; G01S 13/56; G01S 13/52; G01S 13/522; G01S 13/04; G01S 13/0236; G01S 13/886; G01S 17/026; G01S 17/02; G01S 17/50; G08B 13/184; G08B 13/18; G08B 13/183; G08B 13/1895; G08B 13/2491; G08B 13/2494; G08B 13/00; G08B 13/181; G01J 1/0228; G01J 1/44; G01V 8/14
USPC ........................................ 340/541, 556, 557
See application file for complete search history.

(56) References Cited

U.S. PATENT DOCUMENTS

| | | | |
|---|---|---|---|
| 3,378,686 A | 4/1968 | Langmuir | |
| 3,623,057 A | 11/1971 | Balzano | |
| 4,383,242 A | 5/1983 | Sassover | |
| 4,434,363 A * | 2/1984 | Yorifuji | G08B 13/18 250/214 B |
| 4,446,454 A | 5/1984 | Pyle | |
| 4,525,699 A | 6/1985 | Buck | |
| 5,029,271 A * | 7/1991 | Meierdierck | G08C 19/28 329/347 |
| 5,361,070 A * | 11/1994 | McEwan | A61B 5/0507 342/21 |
| 5,767,953 A * | 6/1998 | McEwan | G01C 3/08 356/5.01 |
| 5,815,115 A * | 9/1998 | Carloni | H01Q 1/007 342/359 |

(Continued)

FOREIGN PATENT DOCUMENTS

| | | |
|---|---|---|
| DE | 4215272 | 11/1994 |
| WO | 2001006473 | 1/2001 |

OTHER PUBLICATIONS

Beyazoglu et al; "A Super-Regenerative Optical Receiver Based On An Optomechanical Oscillator"; Proceedings, IEEE International Conference on MEMS; Jan. 18-22, 2015.
Glas; "Principles of SAW-stabilized Oscillators and Transmitters"; EPCOS; May 20, 2001; 8 pages.
Littler et al; "Super-Regenerative Laser Receiver"; Coherence and Quantum Optics VI; 1990; pp. 691, 692 and 695.

(Continued)

*Primary Examiner* — Thomas Mullen
(74) *Attorney, Agent, or Firm* — Fitch, Even, Tabin & Flannery LLP

(57) ABSTRACT

Systems and methods for intrusion detection, including an intrusion detection device configured to send a light source to a retroreflector and receive reflected light from the retroreflector. An alarm is activated if the light source is not detected by the intrusion detection device. The intrusion detection device includes a computing device coupled to a preamplifier, a superregenerative receiver, and a digitizer.

16 Claims, 12 Drawing Sheets

(56) References Cited

U.S. PATENT DOCUMENTS

| | | | | |
|---|---|---|---|---|
| 5,852,672 | A * | 12/1998 | Lu | G01B 11/2441 356/604 |
| 5,880,452 | A * | 3/1999 | Plesko | G02B 26/10 235/462.43 |
| 6,239,736 | B1 * | 5/2001 | McDonald | G01S 7/2922 340/554 |
| 6,822,566 | B2 | 11/2004 | Matthews | |
| 7,034,950 | B2 | 4/2006 | Waschke | |
| 7,135,970 | B2 | 11/2006 | Kowal | |
| 8,115,673 | B1 * | 2/2012 | McEwan | G01S 7/288 342/110 |
| 8,170,523 | B2 | 5/2012 | Kang | |
| 8,907,283 | B2 | 12/2014 | Hatano | |
| 2004/0047634 | A1 * | 3/2004 | Nagai | H04B 10/1127 398/118 |
| 2006/0003701 | A1 * | 1/2006 | Daoud | H04B 10/1121 455/65 |
| 2006/0220947 | A1 * | 10/2006 | Kornbichler | G01S 13/0209 342/118 |
| 2008/0074652 | A1 | 3/2008 | Fouquet | |
| 2008/0100822 | A1 * | 5/2008 | Munro | G01S 7/483 356/4.01 |
| 2008/0204228 | A1 | 8/2008 | Krapf | |
| 2009/0091446 | A1 | 4/2009 | Jang | |
| 2012/0280144 | A1 * | 11/2012 | Guilfoyle | G01J 3/4406 250/458.1 |
| 2013/0141710 | A1 | 6/2013 | Hayden | |
| 2013/0194126 | A1 * | 8/2013 | Paoletti | G01S 13/04 342/55 |
| 2014/0063239 | A1 * | 3/2014 | Furness, III | G01N 21/31 348/143 |
| 2014/0072006 | A1 * | 3/2014 | Sandstrom | H01S 3/1305 372/38.01 |
| 2015/0010120 | A1 | 1/2015 | Yun | |

OTHER PUBLICATIONS

YouTube; "DIY Hacks & How to's: Laser Tripwire"; Nov. 12, 2013; https://www.youtube.com/watch?v=Vf9mwVuXPtY &feature=youtu.be; 2 pages.

YouTube; Araujo; "How to make a "Laser Security Alarm System" at Home on a Breadboard[HD]"; Apr. 24, 2017; https://www.youtube.com/watch?v=n-Phvv4F59c&feature=youtu.be; 2 pages.

YouTube; JLaservideo; "How to Easily Make a Laser Trip-Wire! (mission Impossible Spy Laser Alarm System!!!)"; Nov. 22, 2017; https://www.youtube.com/watch?v=jxxY9uTAD6l&feature=youtu.be; 3 pages.

YouTube; Kipkay; "Amazing Lasers!—Protect Your Home with Lasers!"; Apr. 25, 2008; https://www.youtube.com/watch?v=t0FTzUhdg3w; 2 pages.

YouTube; Kumar; "Laser Light Security Alarm (Science Project)"; Jan. 8, 2017; https://www.youtube.com/watch?v=90lVPFVwuvo &feature=youtu.be; 2 pages.

YouTube; Maker; "How to Make Easy Laser Alarm"; May 2, 2014; https://www.youtube.com/watch?v=m_p18QpGK-A &feature=youtu.be; 3 pages.

YouTube; Mr Maker;"How to make laser light security alarm—DIY"; Feb. 28, 2018; https://www.youtube.com/watch?v=ixhMDV26jZl&feature=youtu.be; 3 pages.

YouTube; patrickikis; "The DIY Laser Security Alarm System Kit Demonstration"; Mar. 24, 2012; https://www.youtube.com/watch?v=vZCo6z1j8Lc&feature=youtu.be; 2 pages.

YouTube; Rap Design; "How to Make Simple Laser Alarm"; May 24, 2016; https://www.youtube.com/watch?v=Z19-a-G-RsU &feature+youtu.be; 2 pages.

YouTube; Siri Homemade; "Laser Security Alarm—How to make a Laser Light Security System at Home"; Jul. 12, 2017; https://www.youtube.com/watch?v=njjFxSsNdHo&feature=youtu.be; 3 pages.

PCT; International Search Report and Written Opinion from the International Searching Authority for PCT/US2017/059688 dated May 18, 2018.

* cited by examiner though the beam of light is blocked by an intruder or other obstruction 200, an alarm is triggered.

INTRUSION DETECTION SYSTEM

BACKGROUND OF THE INVENTION

1. Field of the Invention

The present invention relates generally to intrusion detection systems, and more specifically to photoelectric intrusion detection systems.

2. Discussion of the Related Art

Interrupted photo beams have been used for intrusion detection for many years and many types of photo beam intrusion alarms are known in the art. In essence, photoelectric intrusion systems transmit a focused beam of light from one side of a boundary, for example a property line or driveway entrance, and detect whether the beam of light reaches an opposite side of the boundary. If the beam of light is blocked by an intruder or other obstruction 200, an alarm is triggered.

One problem with conventional photoelectric intrusion detection systems is high power requirements. As a result, most photoelectric intrusion detection systems are hardwired to a power source. This increases the installation cost of the photoelectric intrusion detection system, may require running wires long distances, and limits the placement location of the photoelectric intrusion detection system, especially in large outdoor areas. Battery power may be used to avoid issues due to hardwiring, but the high power requirement results in high capacity, expensive batteries, or frequent battery replacement. Solar cells result in a system that is expensive, bulky, conspicuous and has limited placement options.

A primary power drain for intrusion detection systems is the light source for the projected beam. Existing designs require the light source to be activated for longer times due to the relatively slow response times of the accompanying receiving circuit. Improving response times typically requires increasing power requirements.

Types of light modulation known in the art include unmodulated light, continuous wave and pulse burst. Unmodulated light is a constant intensity light source. It is the oldest and consumes the most power. Continuous wave is a repetitive short "on" pulse followed by a relatively long "off" period. It is the most common modulation method and has moderate power requirements. Pulse burst is a low frequency format based on television IR remote control technology. It is popular with inexpensive products and also uses moderate power.

What is needed is an easy to install photoelectric intrusion detection system that minimizes the power requirements of the system such that it can run on small inexpensive batteries for a long time.

SUMMARY OF THE INVENTION

Several embodiments of the invention advantageously address the needs above as well as other needs by providing an intrusion detection device comprising: a light source projecting a beam across a distance, wherein the light source is periodically modulated at a certain frequency; and a receiver comprising: an optical transducer; and a superregenerative receiver coupled to the optical transducer and configured to periodically oscillate at the modulated frequency of the light source, whereby reception of the modulated light beam from the light source by the optical transducer will influence the superregenerative receiver to oscillate sooner than if the modulated light beam from the light source is not received.

In accordance with another embodiment of the invention an intrusion detection device comprises a light source for projecting a beam across a distance; a receiver to detect the projected light beam comprising: an optical transducer, a compound mirror configured to direct the light beam to the optical transducer.

In accordance with a further embodiment of the invention an intrusion detection device comprises a light source for projecting a beam across a distance; a receiver to detect the projected light beam, further comprising at least one optical filter that is a dichroic filter to pass only light of approximately the same wavelength as the light source.

In accordance with an additional embodiment of the invention an intrusion detection device comprises a light source for projecting a beam across a distance; a receiver to detect the projected light beam, wherein the light beam from the light source is a source of visible light and is further configured to provide a visible light pointer to align at least one of the receiver and a retroreflector.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
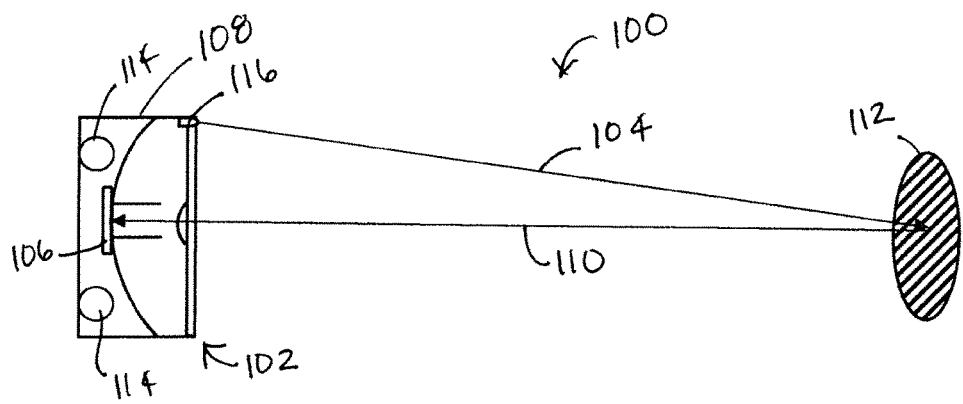
FIG. 1 is a diagram of an intrusion detection system in an unobstructed state in one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring first to FIG. 1, a diagram of an intrusion detection system 100 in an unobstructed state is shown in one embodiment of the present invention. Shown are an intrusion detection device 102, a light beam 104, an electrical components module 106, a housing 108, reflected light 110, a retroreflector 112, a power source 114, and a light source 116.

The intrusion detection system 100 comprises the intrusion detection device 102 and the retroreflector 112. The intrusion detection device 102 includes the light source 116, the electrical components module 106 and the power source 114 housed in the housing 108, as well as additional elements described further below. The electrical components module 106 includes a plurality of electrical components as required for operation of the intrusion detection system 100. The electrical components included within the electrical components module 106 are described further below in FIGS. 7 and 12. The light source 116 in the present embodiment is a laser, but other suitable light sources emitting one or more light beams 104 may also be used. In the present embodiment, the light source 116 is configured to shine in intermittent pulses and the length and frequency of the pulses are coordinated with circuitry in electrical components module 106, which is described further below.

The intrusion detection system 100 also includes the retroreflector 112 located at a distance from the intrusion detection device 102. The retroreflector 112 is configured to receive the light beam 104 from the light source 116 and reflect at least a portion of the light beam 104, the reflected light 110, back to the intrusion detection device 102, where the reflected light 110 is received by one of the electrical components of the electrical components module 106. The electrical components of the electrical components module 106 are configured to monitor the reflected light 110. When the reflected light 110 matches the light expected to be received if there is no obstruction, as in FIG. 1, no external action is taken by the intrusion detection device 102.

Figure 2:
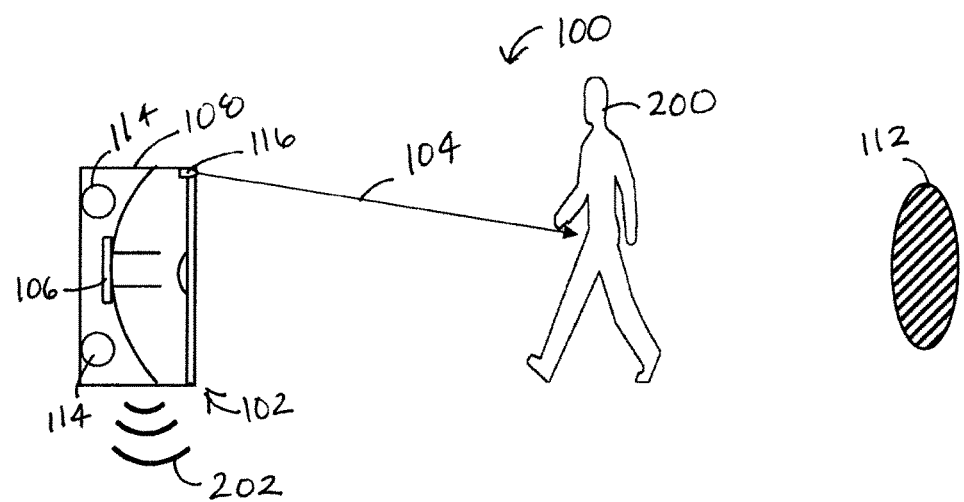
FIG. 2 is a diagram of the intrusion detection system in an obstructed state in one embodiment of the present invention.

Referring next to FIG. 2, a diagram of the intrusion detection system 100 is shown in an obstructed state. Shown are the intrusion detection device 102, the light beam 104, the light source 116, the electrical components module 106, the housing 108, the retroreflector 112, an obstruction 200, and an alarm signal 202.

In the obstructed state of the intrusion detection system 100, the obstruction 200 prevents the light beam 104 from reaching the retroreflector 112, whereby the expected reflected light 110 is not received by the electrical components module 106. In response, the electrical components module 106 triggers the alarm signal 202. The alarm signal 202 may be a visual or audible alarm signal 202 of the intrusion detection device, or the electrical components module 106 may be configured to send the alarm signal 202, for example a radio signal or a wireless network signal, indicating an alarm. In some embodiments the intrusion detection device 102 may be coupled to local and/or external networks. In some embodiments multiple intrusion detection devices are used and are in communication with each other. The multiple device system would also be coupled to a network.

Figure 3:
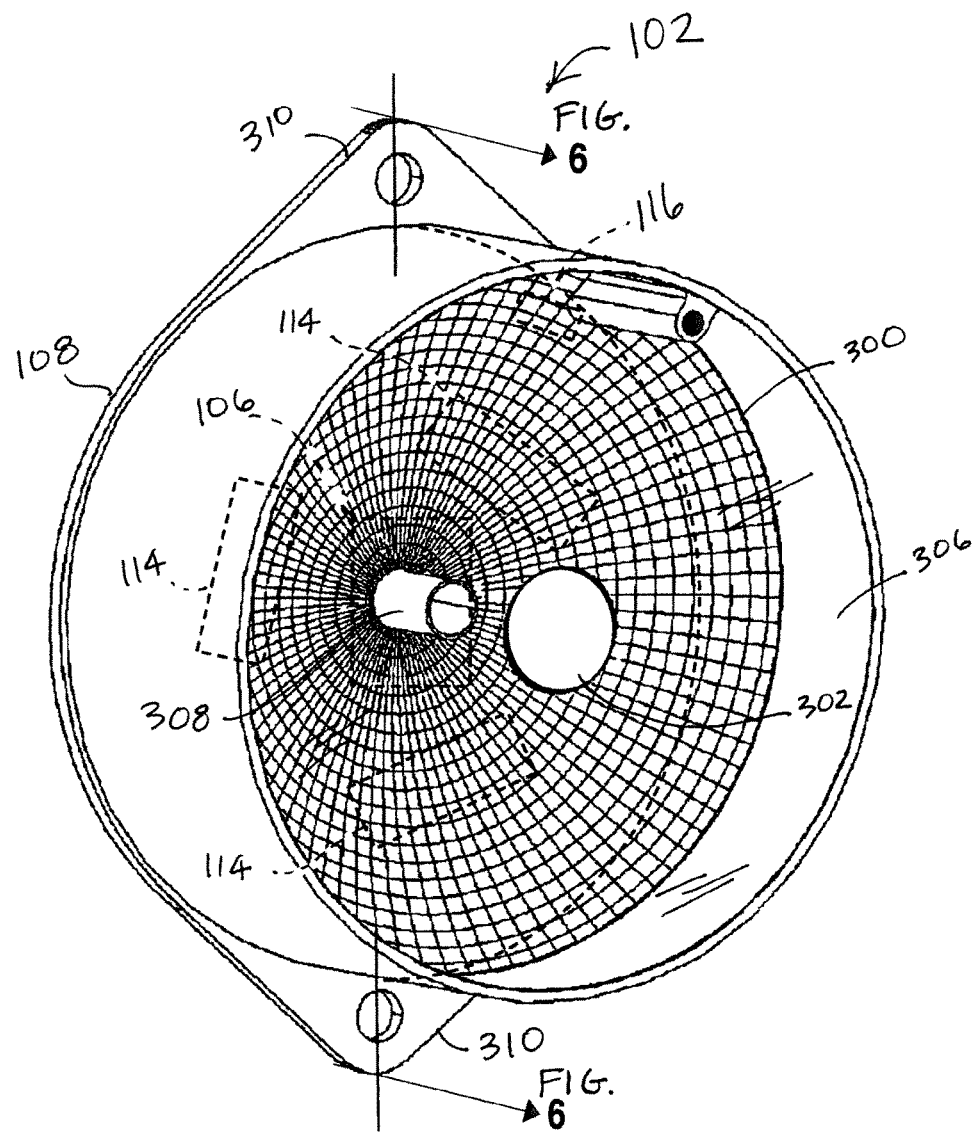
FIG. 3 is a perspective view of an intrusion detection device of the intrusion detection system in one embodiment of the present invention.

Referring next to FIG. 3, a perspective view of the intrusion detection device 102 in one embodiment of the present invention is shown. Shown are the light source 116, the electrical components module 106, the housing 108, the power source 114, a primary mirror 300, a secondary mirror 302, a cover 306, a shading tube 308, and two mounting flanges 310.

The primary mirror 300 is a concave parabolic dish shape with a curvature configured to receive the reflected light 110 from the retroreflector 112 and direct the reflected light 110 to the secondary mirror 302. The primary mirror 300 includes a central opening configured to receive the shading tube 308. The primary mirror 300 includes a central circular opening configured to receive at least a portion of the reflected light 110 from the secondary mirror 302, as described further below in FIG. 6. The primary mirror 300 is coupled to and is housed within the housing 108. The housing 108 is a cylindrical shape generally matching the diameter of the primary mirror 300 and includes a base coupled to an end of the cylindrical shape. The housing 108 in one embodiment is comprised of plastic, but may be any material or shape suitable for housing the various components of the intrusion detection device. In the present embodiment, the base includes opposing mounting flanges 310 extending outward from the housing cylinder base and including holes for mounting the intrusion detection device 102 to a surface. In other embodiments alternative mounting configured may be used. The primary mirror 300 is oriented within the housing 108 with the concave side of the primary mirror 300 facing the open end of the housing 108. The diameter of the housing 108 is sized for receiving the components mounted within the housing 108, e.g. the primary mirror 300, power source 114, etc. In one embodiment the housing diameter is approximately 3.5 inches. In another embodiment, the housing diameter is approximately two inches.

Figure 4:
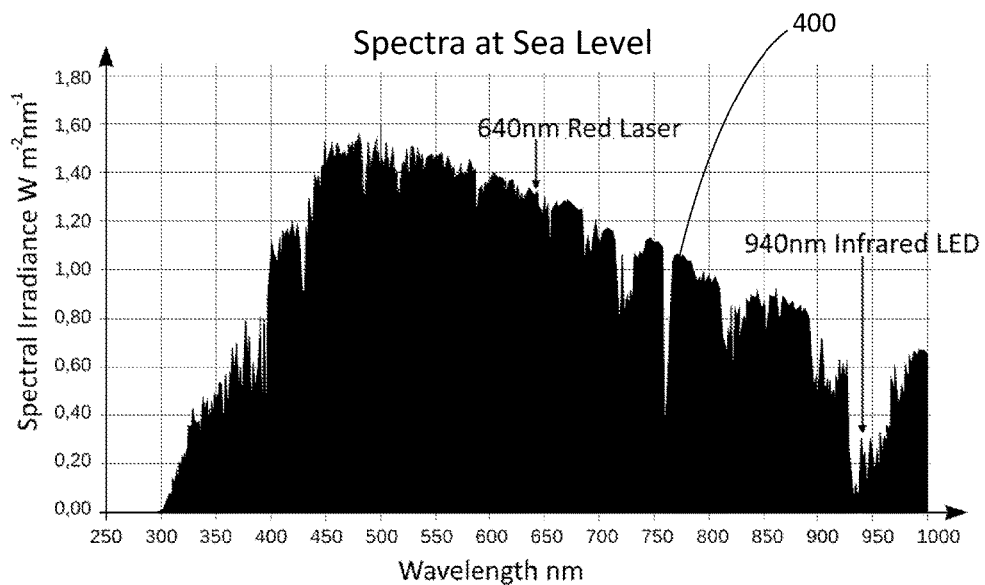
FIG. 4 is a spectral diagram of sunlight at sea level.

The disc shaped cover 306 is coupled to and covers the open end of the housing 108. The cover 306 is translucent and is configured to absorb some unwanted light wavelengths and allow to pass through light in the wavelength of interest. In the present embodiment, the light source 116 comprises visible 640 nm red laser in lieu of a 940 nm infrared LED as commonly used. Sunlight can saturate a photodiode preventing it from responding to the laser signal. Sunlight spectral irradiance at sea level is shown in FIG. 4, plotting a solar irradiance function in watts per square meter (y-axis) vs. wavelength of light (x-axis). It can be seen in FIG. 4 that spectral irradiance is greater around the 640 nm wavelength of the red laser compared to the 940 nm wavelength of the infrared LED. Because, as shown in FIG. 4, the sunlight has a higher intensity near 640 nm as compared to 940 nm, a dichroic filter 600 is coupled (using adhesive or other suitable means) to the top of a photodiode 602 coupled to the electrical components module 106 (or to package encapsulation of the photodiode) and is used to reduce the higher intensity light and prevent saturation of the photodiode 602, as dichroic filters can be finely tuned to pass a narrow range of wavelengths and reflect unwanted ones. This approach keeps the more expensive dichroic filter 600 small, and some of the unwanted photon heat can be removed at the cover 306 before the light is concentrated on the photodiode 602.

Figure 5:
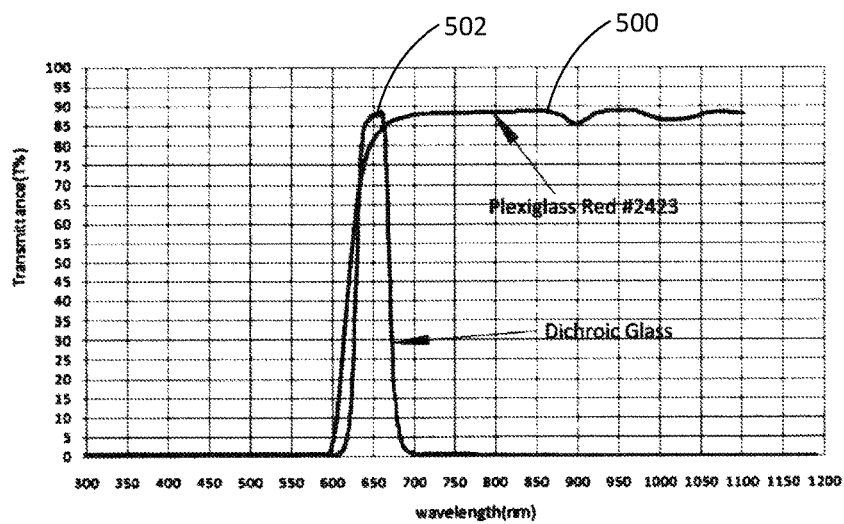
FIG. 5 is a filter chart showing wavelength vs. transmittance for a dichroic glass filter and a plexiglass red #2423 filter.

In the present embodiment, the cover 306 comprises polymethyl methacrylate (acrylic) pigmented to pass the 640 nm wavelength, for example Plexiglass red #2423. The plexiglass red #2423 generally passes wavelengths above 600 nm, as shown in the filter chart of FIG. 5. FIG. 5 shows a Plexiglass red transmittance function and a dichroic glass filter transmittance function. The transmittance function for each material indicates the percent transmittance (y-axis) vs. wavelength of light (x-axis). As shown in FIG. 5, the Plexiglass red #2423 generally passes light at a wavelength above 600 nm. The transmittance percentage of the dichroic filter selected to pass light at a wavelength between 625 nm and 675 nm is also shown. As shown in FIG. 5, the combination of the Plexiglass red #2423 and a dichroic glass filter filters out light outside the wavelength of interest. It will be understood that the combination of the Plexiglass red #2423 cover 306 and the dichroic glass filter are but one example of filtering out undesired light wavelengths and reducing the light intensity, and alternate materials/combination may be used to produce suitable results.

The secondary mirror 302 is a convex parabolic disc shape coupled to the inside face of the cover 306 such that the convex side faces the concave side of the primary mirror 300. The secondary mirror 302 has a diameter and curvature configured to receive the reflected light 110 from the primary mirror 300 and reflect the reflected light 110 into the center of the primary mirror 300.

The cylindrical shading tube 308 is mounted to the concave side of the primary mirror 300. A first end of the sleeve is coupled to the primary mirror 300 and surrounds the opening. The cylindrical sleeve extends away from the primary mirror 300 towards the cover 306. The photodiode 602 receives the reflected light 110 reflected from the secondary mirror 302 through the cylinder sleeve and into the opening. The thin-walled shading tube 308 blocks sunlight and other background light from saturating the photodiode 602. The shading tube 308 blocks any off-axis light while letting the cone of focused light from the secondary mirror 302 reach the photodiode 602.

The use of the retroreflector 112 requires the light beam 104 to travel twice as far. Imperfections in the reflector absorb and scatter the light signal, further reducing the range that the signal can be received. To compensate for the weaker signal, the large collecting lens of the primary mirror 300 is used. A short focal length is desirable in order to minimize the profile of the intrusion detection device 102. The present embodiment of the invention uses the compound mirror comprising the primary mirror 300 and the secondary mirror 302, which achieves a larger lens compared to a refractive lens without increasing mass and folding the focal length in half. The light filtered by the cover 306 is collected by the parabolic primary mirror surface and reflected towards the smaller parabolic secondary mirror 302 mounted to the underside of the cover 306. The secondary mirror 302 reflects the focused light through the hole in the center of the primary mirror 300. In some embodiments in lieu of the compound lens shown a refractive lens may be used.

The light source 116 is coupled to the electrical components module 106 and oriented to provide the light beam 104 generally parallel to the axis of the housing 108. In the present embodiment, the light source 116 is a laser. The laser includes shielding as necessary to prevent the laser from directly illuminating the photodiode 602.

Typically, the electrical components of the electrical components module 106 are mounted on a PC board behind the primary mirror 300. EMF shielding is provided as necessary. The electrical components are coupled to the power source 114. The power source 114 is sized to provide necessary power to the electrical components. In one embodiment, the power source 114 is 3 AA batteries. In another smaller embodiment the power source 114 is a single lithium button battery such as a CR2450.

Figure 6:
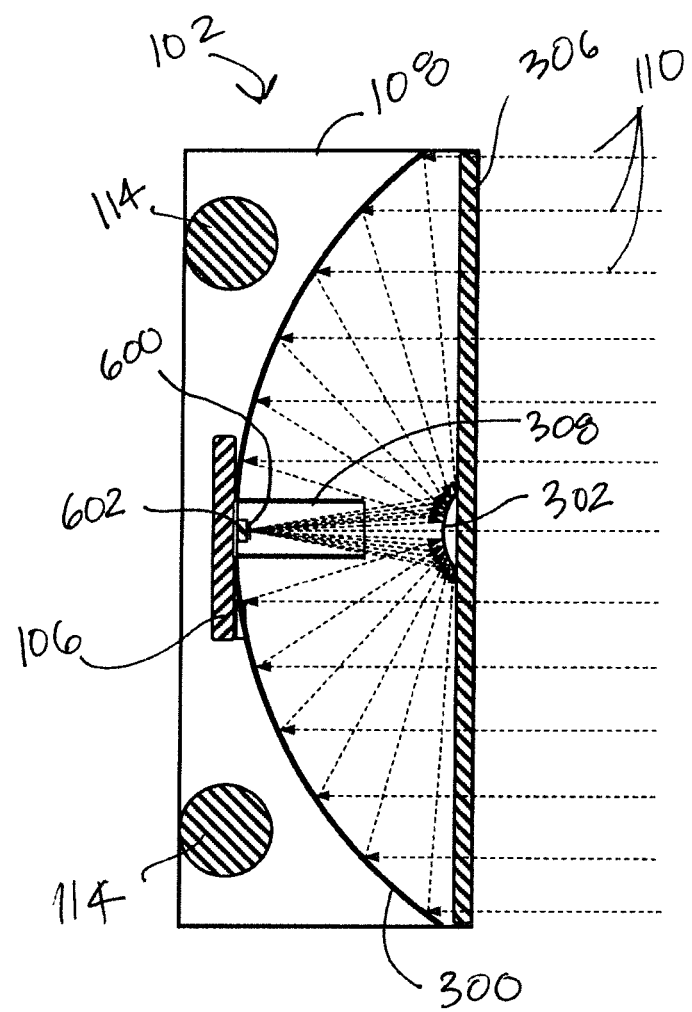
FIG. 6 is a sectional view of the intrusion detection device.

Referring next to FIG. 6, a sectional view of the intrusion detection device 102 is shown. Shown are the electrical components module 106, the housing 108, the cover 306, the primary mirror 300, the secondary mirror 302, the shading tube 308, a dichroic glass filter 600, the photodiode 602, the power source 114 and the reflected light 110. For clarity, the light source 116 is not shown.

As previously described in FIG. 3, the intrusion detection device 102 includes the primary and secondary mirrors 300, 302, the electrical components module 106, the housing 108, the cover 306, the light source 116, and the shading tube 308. In operation, as previously described in FIGS. 1 and 2, the light source 116 produces the light beam 104, in the present embodiment a laser beam. In the case of no obstruction, the light beam 104 is reflected back to the intrusion detection device 102 by the retroreflector 112 as shown in FIG. 1. The reflected light 110 reaches the cover 306, whereby the cover 306 is configured such that the wavelength of interest passes through the cover 306.

The reflected light 110 passing through the cover 306 then contacts the concave primary mirror 300. The curvature of the primary mirror 300 reflects at least a portion of the reflected light 110 to the convex secondary mirror 302 mounted to the underside of the cover 306. The curvature of the secondary mirror 302 reflects at least a portion of the reflected light 110 into the opening in the primary mirror 300. The photodiode 602 is coupled to the electrical components module 106 and located below the opening, whereby the photodiode 602 receives at least a portion of the reflected light 110 passing through the opening. The photodiode 602 is electrically coupled to the electrical components module 106 (which is coupled to the housing 108). The electrical components module 106 receives the response of the photodiode 602, whereby the alarm is activated when the received reflected light 110 is interrupted by the obstruction 200, as described previously in FIGS. 1 and 2. Circuitry coupled to the photodiode 602 is described below in FIG. 12. In the present embodiment, the dichroic glass filter 600 is coupled to the photodiode 602 such that only wavelength of interest reflected light 110 passes through the dichroic filter 600 before reaching the photodiode 602. While the present embodiment includes a photodiode as the optical transducer, any suitable type of optical transducer may be used.

In some embodiments the intrusion detection device may include a camera.

Figure 7:
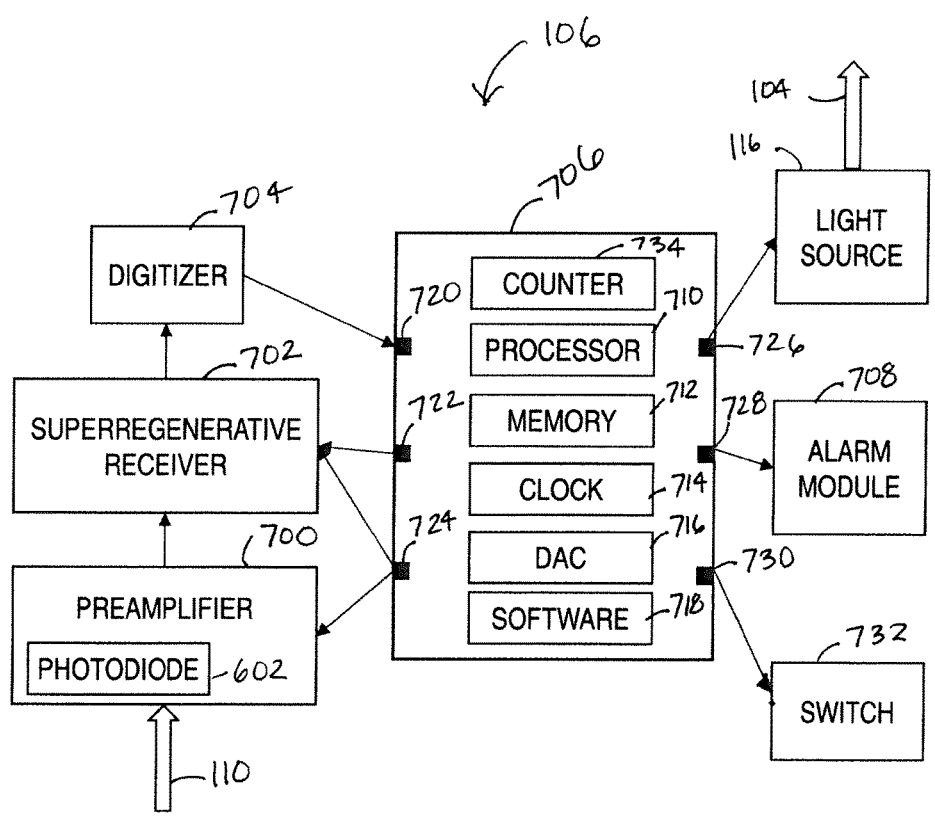
FIG. 7 is a schematic diagram of a plurality of electrical components of the intrusion detection device in one embodiment of the present invention.

Referring next to FIG. 7, a schematic diagram of the plurality of electrical components of the intrusion detection device 102 is shown in one embodiment of the present invention. Shown are a preamplifier 700, the photodiode 602, a superregenerative receiver 702, a digitizer 704, a computing device 706, the light source 116, an alarm module 708, a processor 710, non-transitory memory 712, a clock 714, a digital-to-analog convertor 716, software 718, a detect port 720, a tune/DAC port 722, a quench port 724, a light source port 726, an alarm port 728, a switch port 730, a switch 732, and a counter 734.

The computing device 706 is operatively coupled to the light source 116, the alarm, the switch 732, the digitizer 704, the superregenerative receiver 702 (also referred to as the SRR), and the preamplifier 700, each coupled to the computing device 706 via one of the plurality of input/output ports of the computing device 706 (the detect port 720, the tune/DAC port 722, the quench port 724, the light source port, the alarm port 728, and the switch port 730). A module including the photodiode 602 and the SRR 702 may also be referred to as a receiver module. The computing device 706 comprises the processor 710, non-transitory memory 712 coupled to the processor 710, instructions/software 718 stored on the non-transitory memory 712 and configured to run on the processor 710, the plurality of input/output ports 720, 722, 724, 726, 728, 730, the digital-to-analog convertor (DAC) 716, a clock 714, and the counter 734. The computing device 706 in the current embodiment is a microcontroller. In other embodiments the computing device 706 may be a PLC, gateway, or other computing device including the above-mentioned components and suitable for carrying out the functions described herein.

As previously described, the light source 116 emits the light beam 104. In the present embodiment, the light source 116 is a 640 nm wavelength laser, but in other embodiments alternative light sources may be used, for example a 940 nm LED in lieu of the laser for a more inexpensive, short-range system. In another embodiment two lasers are mounted coaxially: a visible laser pointer and an infrared laser for the light source. The light beam 104 is emitted in a cycle as determined by the software 718 running on the processor 710. Exemplary light cycles are described further below in FIGS. 10 and 11.

The switch 732 is coupled to the switch port 730 of the computing device 706 and, when manually operated, activates the light source 116 for use as a constant high intensity visible pointer to aid in the initial alignment of the light source 116 with the retroreflector 112. The computing device 706 is configured to turn off the light source 116 after a pre-determined period of time after the switch 732 has been pressed.

The alarm module 708 is coupled to the computing device 706 via the alarm port 728 and activates an alarm upon receiving an indication from the computing device 706. One embodiment of the alarm module 708 is shown below in FIG. 12. In the present embodiment, the alarm is a wireless signal transmitted from the alarm module.

The superregenerative receiver 702 receives signals from the preamplifier 700 and the computing device 706. The superregenerative receiver 702, as is commonly known in the art, is an amplifying circuit including an oscillator. Upon turning on of the intrusion detection system 100, the computing device 706 performs an initialization routine to calibrate the light source pulse time and modulation frequency and the SRR oscillation frequency.

The preamplifier 700 includes the photodiode 602 which is configured within the intrusion detection device 102 to receive the reflected light 110 originating from the output for the current light cycle. The preamplifier 700 is powered on/off via output from the computing device 706 via the quench port 724. The preamplifier 700 passes the signal received from the photodiode 602 to the superregenerative receiver 702. The signal from the preamplifier 700 influences the superregenerative receiver 702 to oscillate and amplify the signal further. The oscillations from the superregenerative receiver 702 are sent to the digitizer 704. When the oscillations exceed an oscillation threshold level a signal is sent from the digitizer 704 (which has digitized the signal) to the computing device 706 via the detect port 720, whereby the computing device 706 determines a time-to-oscillation length 1122. If the time-to-oscillation length 1122 does not exceed the expected value based on receiving of the reflected light 110 by the photodiode 602 (as previously determined by the intrusion detection device 102), the alarm is not activated. The computing device 706 sends a signal to the superregenerative receiver 702 to quench the oscillations via the quench port 724, and the cycle re-starts.

In the case of the obstruction 200, the superregenerative receiver 702 does not oscillate early without the influence of the light stimulus, therefore the time for the SRR 702 to oscillate exceeds the expected value, and the computing device 706 activates the alarm via the alarm port 728. The electrical components of the electrical components module 106 and operation thereof are described in more detail below in FIGS. 9-12.

Referring again to FIG. 7, the intrusion detection system 100 of the present embodiment has a lower power demand, resulting in a longer operating life on small, inexpensive batteries. The intrusion detection system 100 is configured to have a range of less than 50 feet in a small 2 inch embodiment, and a range of greater than 100 feet in a large 3.5 inch embodiment.

Superregenerative receivers (SRRs) have been primarily used for the reception of low bandwidth radio signal (e.g. audio). SRRs are not typically thought of for the detection of optical communications due to their relatively low sampling bandwidth. An intrusion detection system based on a photo beam only has to check if an obstruction passes the photo beam about every 30 ms, which is a very low sampling rate, suitable for the SRR 702. Additionally, the SRR 702 only needs to be powered on at the sampling time so the SRR circuitry can be turned off during the rest of the alarm cycle. Another advantage of using the SRR 702 in the intrusion detection device 102 is that the SRR 702 uses very few active components, typically one or two transistors. This reduces the cost of the system.

Figure 12:
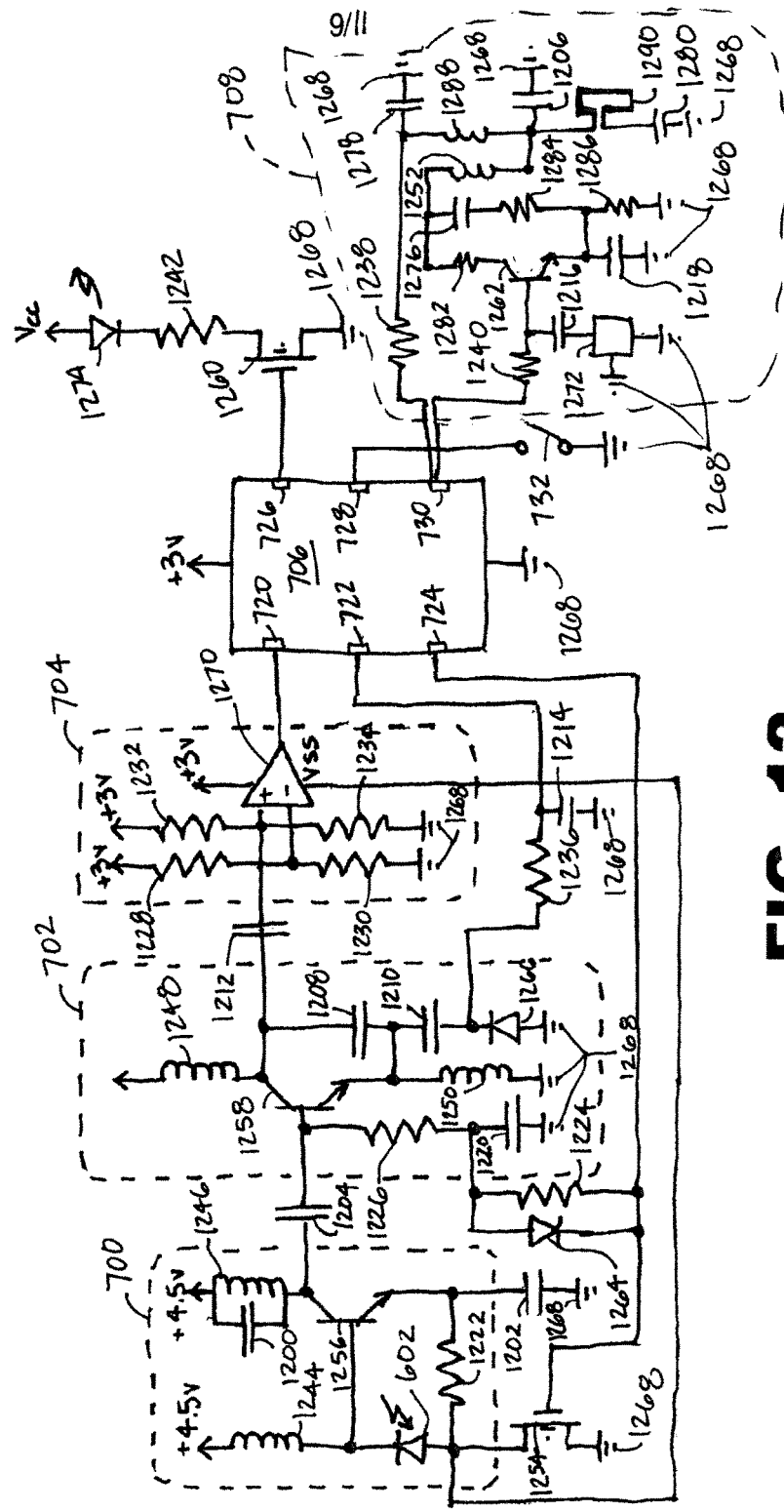
FIG. 12 is a circuit diagram of a portion of the electrical components in one embodiment of the present invention.

Superregenerative receivers can vary significantly in frequency due to variations in supply voltage and/or transistor temperature. The present invention compensates for these changes by use of the clock 714 (timer/counter) and the DAC 716 of the computing device 706. When the device 102 is powered up, and periodically thereafter, a calibration procedure is run. The results are used to adjust the frequency of the light source 116 by tuning the computing device 706 clock 714 and/or adjust the SRR oscillation frequency by changing the DAC voltage on a reverse biased diode (diode D2 1266 as shown in FIG. 12) and therefore a capacitance contribution of the reverse biased diode to the LC resonance frequency of the SRR 702 seen at the collector of transistor Q3 1258 until the shortest time to oscillation is reached, indicating the transmit and receive frequencies match. This tuning feedback loop is made easier by locating the transmitter (the light source 116) and the receiver (the photodiode 602) in the same device.

In some embodiments, the SRR oscillation output on the detect port 720 can be connected to the counter 734 of the computing device 706. The counter 734 is then gated on for 1024 (or other multiple) clock 714 cycles. The resulting counter value is a ratio of the SRR oscillation frequency relative to the clock 714 frequency. The SRR oscillator 702 and/or the clock 714 can be adjusted until a 1024:1024 ratio is achieved.

The time from the light source 116 pulse to a level of oscillation of the SRR 702 (the time-to-oscillation length 1122) is measured by the computing device 706 in order to detect if the light source 116 has been blocked by an intruder or other obstruction 200. A laser signal modulated at the frequency of the SRR 702 will stimulate the SRR 702 to oscillation in a minimum amount of time. If the laser signal is blocked, the SRR 702 will self-oscillate at a much later time from just environmental effects such as variations in background noise. Time-to-oscillation lengths 1122 are analyzed using software 718 to identify false reflections or adverse weather conditions, and adjust the oscillation threshold time accordingly. Variations in time-to-oscillation length 1122 are also measured to help ensure the transmit frequency and the receive frequency match.

Figure 8:
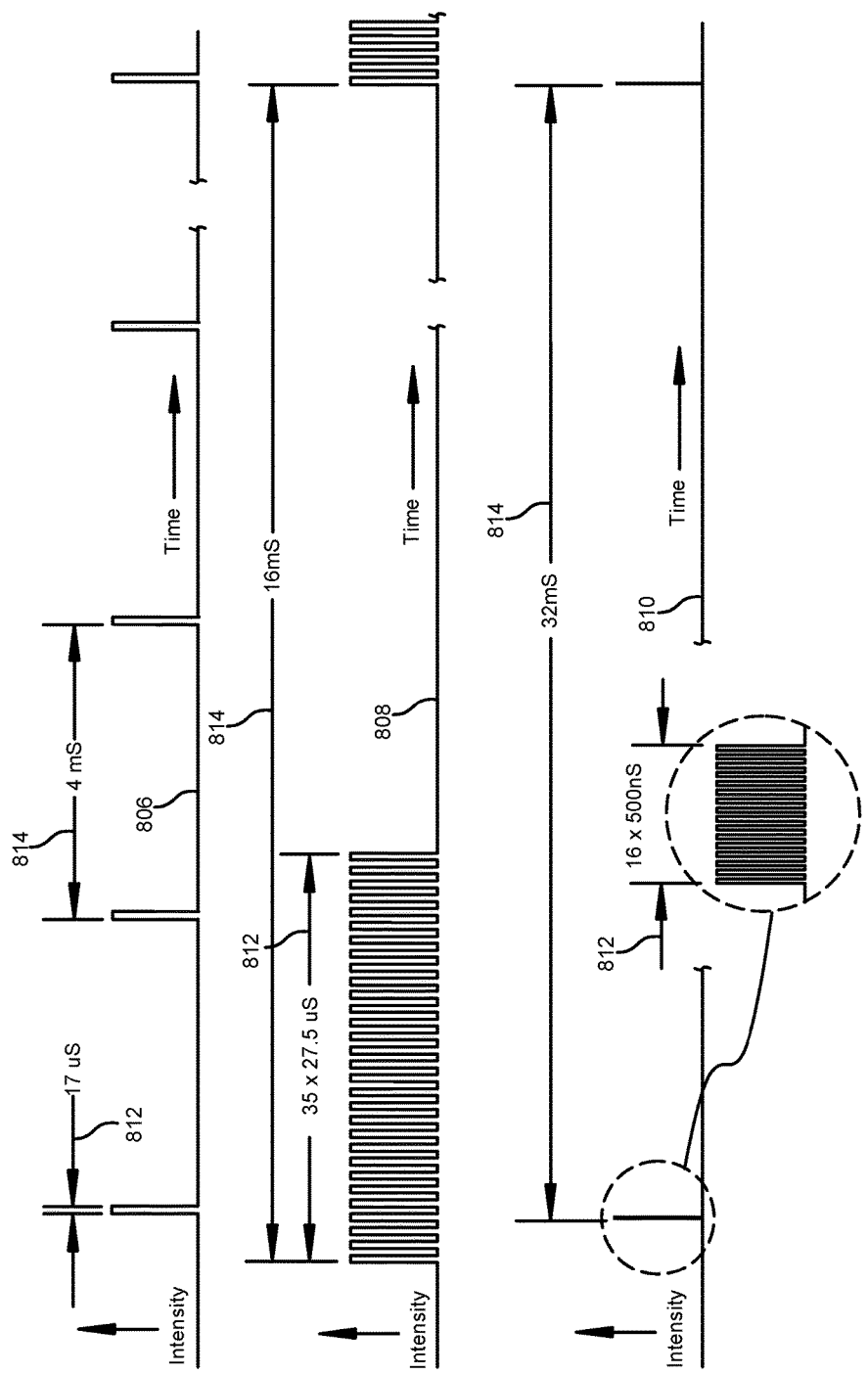
FIG. 8 is a plurality of light modulation diagrams for various embodiments of intrusion detection systems.

Referring next to FIG. 8, light modulation functions for various embodiments of intrusion detection systems are shown. Shown are a continuous wave light modulation 806, an IR remote light modulation 808, a superregenerative receiver light modulation 810, an emission length 812, and a cycle length 814.

Each light modulation function 806, 808, 810 shows light intensity (y-axis) over time (x-axis) for each type of light modulation. The continuous wave light modulation 806 shows a repetitive square wave continuous wave light modulation 806. The continuous wave light modulation 806 has a relatively short single pulse emitting time or emission length 812 (17 µs as shown in the exemplary cycle 806) and a relatively long time between cycles (the 4 ms cycle length 814 as shown in the exemplary cycle). During the emission length 812 the light intensity is constant, i.e. the light is continuously on during a single pulse. The continuous wave light modulation 806 is a common cycle method for intrusion detection systems. A matching receiver "looks" for the pulse, or spike, in light intensity at the cycle time when the pulse is emitted. If too many pulses are missed by the receiver, an alarm triggers. However, other EMF sources may cause spikes interfering with the detection of the pulse, thus an alarm decision cannot be made on a single cycle.

Devices based on IR remote control technology are also commonly used in intrusion detection systems. The exemplary IR remote light modulation 808 is shown in FIG. 8. The overall cycle length 814 shown is 16 ms, with the emission length 812 of 35×27.8 µs=973 µs. During the emission length 812 the IR remote light modulation 808 comprises 35 repeated light source pulses of length 13.9 µs on, followed by 13.9 µs off, in other words 35×27.8 µs at 50% duty. The light source is therefore active for a significant portion of the IR remote light modulation 808.

For the exemplary superregenerative receiver light modulation 810 shown in FIG. 8, the overall cycle length is longer at approximately 32 ms. However, the emission length 812 is only comprised of pulses equal to 16×500 ns at 50% duty (16 pulses with 250 ns on and 250 ns off), a total emission length 812 of 8 µs, a much shorter time compared to the emission length 812 required for the IR remote system (973 µs). The short pulse time and resulting short emission length 812 allows the SRR 702 to be on for less time and therefore require less power. The high frequency modulated light can be well filtered by the received module to ensure a valid signal each cycle.

Most intrusion detection devices use infrared LEDs as the light source because they are invisible and their low intensity is safe for continuous eye exposure. The exemplary invention utilizes the low power 5 mW visible red 640 nm laser light source 116. Lasers provide a more focused light beam that can be detected over a longer range. Although intruder detection devices using a laser light source have been proposed before, they have never been widely implemented due to the potential for eye damage that can come from inadvertently staring into the light source. An infrared laser would be even more dangerous because the invisible beam would not trigger the blink reflex of the eye. Because the present invention operates at a much higher modulation frequency, the light source 116 is on for a much smaller fraction of the time (1/8000 vs. 1/33 for IR remote modulation). This reduces the average intensity of the laser to under a microwatt. At this level it will not damage the naked eye. In addition, the 640 nm light source would appear so dim it can't easily be seen by intruders.

It will be understood that various approaches are well known in the art for modulating and receiving the light source 116. Although the embodiments disclosed herein disclose use of the laser light source and the laser/superregenerative receiver light modulation 810, other light sources and/or light modulations may be used in the intrusion detection system 100.

Figure 9:
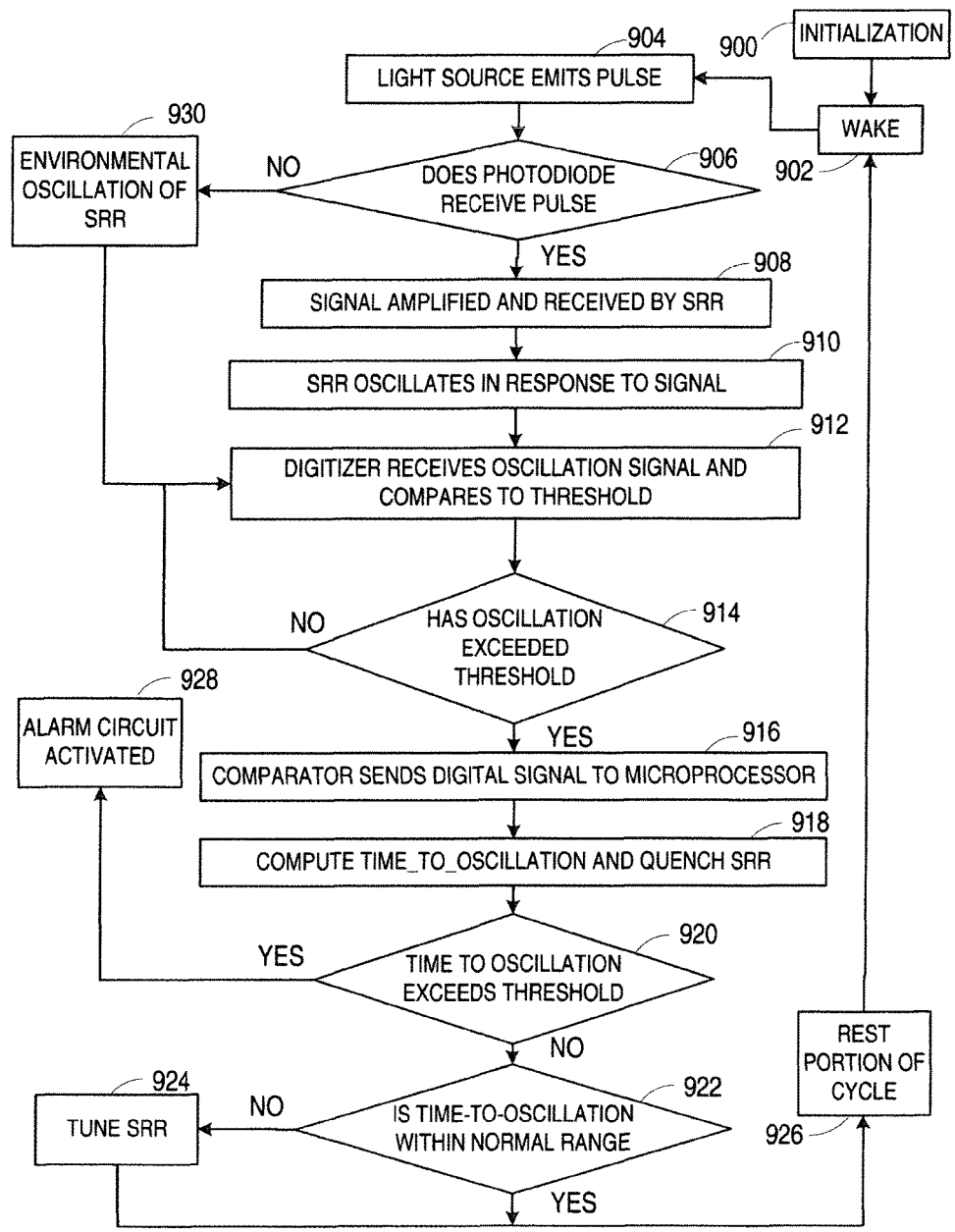
FIG. 9 is a flowchart of a method of intrusion detection of the present invention.

Referring next to FIG. 9, a flowchart of a method for intrusion detection is shown. Shown are an initialization step 900, a wake step 902, an emit light step 904, a photodiode receives pulse decision point 906, a preamplify step 908, a SRR oscillates step 910, a digitizer step 912, an oscillation exceeds threshold decision point 914, a comparator 1270 sends signal step 916, a compute time-to-oscillation step 918, a time-to-oscillation comparison decision point 920, a sleep period step 926, a tune SRR step 924, an SRR self-oscillation step 930, a check normal time-to-oscillation decision point 922, and an activate alarm step 928.

In the first initialization step 900, when the system is first powered on the computing device 706 runs a calibration routine. In one embodiment a successive approximation routine running on the computing device 706 adjusts a combined value of a tuning register of the clock 714 (most significant bits) and the DAC register 716 (least significant bits) which varies the SRR 702 oscillation frequency. Starting with the most significant bit an unblocked detection cycle is run with the bit set high and then low and the value that produces the shortest time to oscillation is saved indicating that the light source modulation frequency and the SRR oscillation frequency match. An exemplary process is shown below in FIG. 14. Next, a time-to-oscillation threshold length 1120 is determined. The computing device 706 averages the time-to-oscillation length 1122 for a number of unblocked detection cycles and then for a number of blocked detection cycles. Blocked detection cycles are simulated by running a "dark" cycle, that is a detection cycle in which the light source 116 is intentionally not pulsed, in order to allow the SRR 702 to reach self-oscillation. The time-to-oscillation threshold length 1120 is set halfway between the average time-to-oscillation length for a dark (blocked) cycle and an unblocked cycle. Other techniques for calibrating the light source 116 and SRR 702 may include a look-up table in non-transitory memory of factory-measured values from the clock 714 and DAC tuning registers at a range of temperatures or the frequency counting technique previously described.

The computing device 706 then enters a 32 ms sleep step wherein the computing device 706 is placed in a standby mode and power is off to the photodiode 602 and the preamplifier 700.

In the next wake step 902, the computing device 706 wakes from the previous cycle. The computing device 706 then outputs a logic high level on the quench port 724 which turns on transistor Q1 1254 (as shown in FIG. 12), which is coupled to the preamplifier 700 and the superregenerative receiver 702, to provide a ground power connection to the photodiode 602, the preamplifier 700, and the comparator 1270 of the digitizer 704. The high logic level also slowly charges capacitor C4 1220 of the superregenerative receiver 702.

In the next emit light pulse step 704, the SRR 702 is on the verge of oscillation due to charging of capacitor C4 1220. The computing device 706 then activates the light source 116 to emit 16-500 ns pulses during the emission length 812. The process then proceeds to the photodiode receives pulse decision point 906.

In the unobstructed case, in the photodiode receives pulse decision point 906 if the photodiode 602 receives the reflected light 110, the process proceeds to the preamplify step 908. If the reflected light 110 is obstructed, the process proceeds to the SRR self-oscillation step 930. In the SRR self-oscillation step 930, the SRR 702 does not oscillate in response to the reflected light 110, but as the SRR 702 is slowly biased on by the charging of C4 1220, the feedback gain increases towards infinity. At a later point self-oscillation of the SRR 702 will be triggered, for example by thermal noise of transistor Q3 1258. The process then proceeds to the digitizer step 912 as described below.

In the case where the photodiode 602 receives the reflected light 110 and the process proceeds to the preamplify step 908, the preamplifier 700 amplifies the signal output by the photodiode 602 in response to receiving the reflected light 110 and the signal travels in the circuit to the SRR 702.

In the following SRR oscillates step 910, the signal received by the SRR 702 causes transistor Q3 1258 of the SRR 702 to begin oscillating. The oscillating signal is output to the digitizer 704.

In the next digitizer step 912, the digitizer 704 repeatedly receives the increasing oscillating signal. In the next oscillation exceeds threshold decision point 914, the comparator 1270 of the digitizer 704 repeatedly checks whether the SRR oscillation level (magnitude) has exceeded an oscillation threshold level set on the inverting input of 1270. If the SRR oscillation magnitude has not exceeded the oscillation threshold level, the process returns to the SRR oscillates step 910, and the SRR oscillation level continues to increase.

If the SRR oscillation level has exceeded the oscillation threshold level, the process proceeds to the comparator 1270 sends signal step 916. In the comparator sends signal step 916, in response to the SRR oscillation magnitude exceeding the oscillation threshold level, the comparator 1270 sends a digital version of the oscillation to the computing device 706. The process then proceeds to the compute time-to-oscillation step 918.

In the compute time-to-oscillation step 918, in response to receiving the signal from the comparator 1270, the computing device 706 determines a length of time from the emitting of the light pulse to the receiving of the signal from the comparator 1270, which is the time-to-oscillation length 1122. The computing device 706 also sends a quench signal to turn off power to the photodiode 602, preamplifier 700, and digitizer 704 and quench the SRR oscillations. The process then proceeds to the time-to-oscillation exceeds threshold decision point 920.

During the time-to-oscillation exceeds threshold decision point 920, the computing device 706 compares the time-to-oscillation length 1122 to the time-to-oscillation threshold length 1120. If the time-to oscillation length 1122 exceeds the oscillation threshold level length, which occurs when the SRR 702 eventually self-oscillates due to the noise feedback gain and not from the photodiode 602 response, the process continues to the activate alarm step 928. In the activate alarm step 928, in response to the time-to-oscillation length 1122 exceeding the time-to-oscillation threshold length 1120, the computing device 706 directs the alarm module 708 to send the alarm. In some embodiments the alarm is audible.

If the time-to oscillation length 1122 does not exceed the oscillation threshold level length 1120, which occurs when the photodiode 602 receives the reflected light 110, the process proceeds to the check normal time-to-oscillation decision point 922.

During the check normal time-to-oscillation decision point 922, the computing device 706 checks whether the time-to-oscillation length 1122 is within the normal range as determined during the initialization step or by previous cycles. If the time-to-oscillation length 1122 is within the normal range, the process proceeds to the sleep period step 926, then after a pre-set period of time (the rest period) returns to the wake step and a new cycle is started.

If the time-to-oscillation length 1122 is not within the normal range, the process proceeds to the tune SRR step 924, and the time-to-oscillation threshold length 1120 is re-calculated by the computing device 706. The process then returns to the sleep period step 926 and a new cycle is started.

Figure 10:
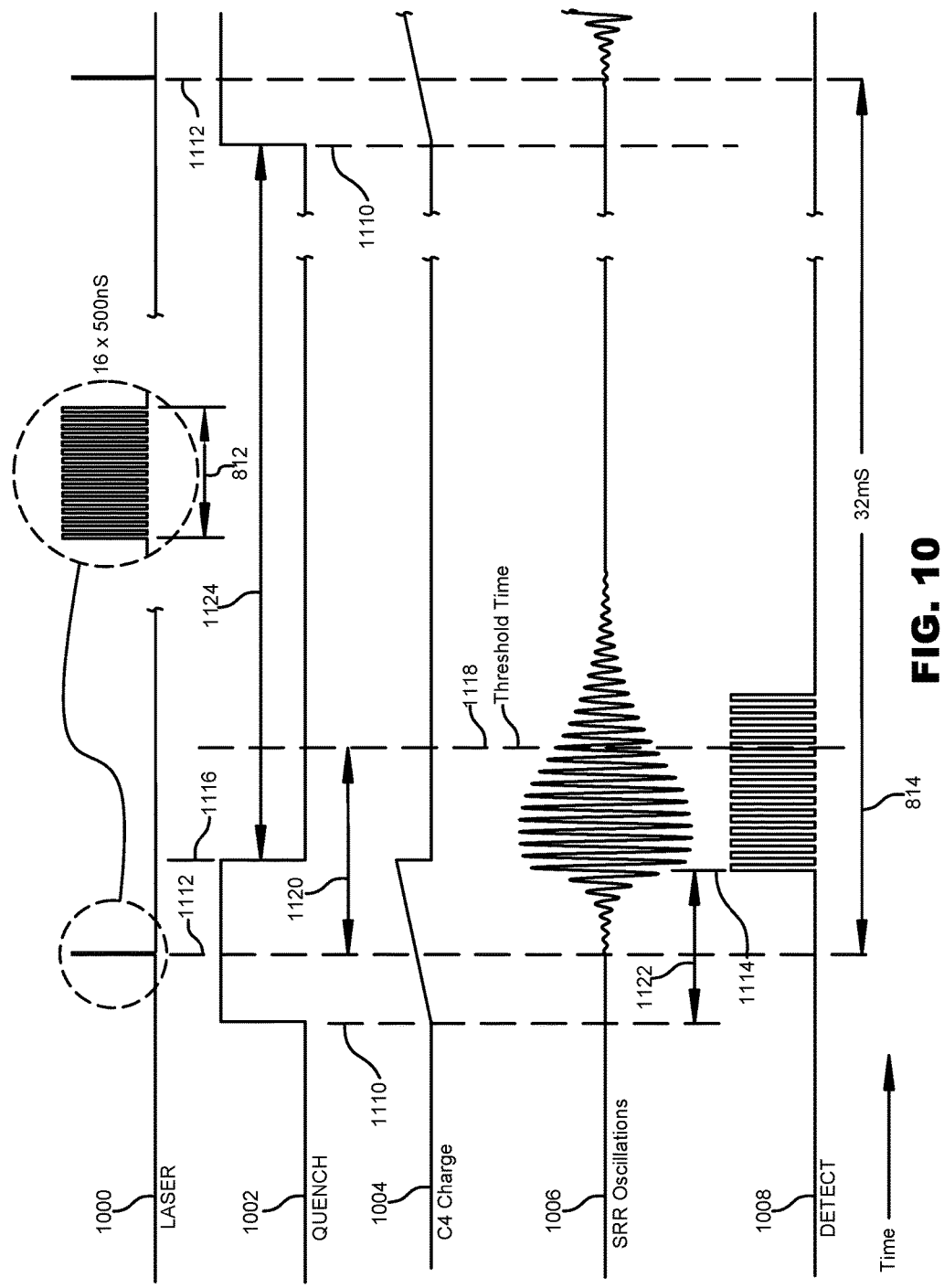
FIG. 10 is an unblocked cycle timeline of the method of intrusion detection of FIG. 9.

Referring next to FIG. 10, an unblocked cycle timeline is shown for the intrusion detection method of FIG. 9. Shown are the emission length 812, the cycle length 814, a laser pulse function 1000, a quench function 1002, a C4 charge function 1004, an SRR oscillation function 1006, a detect function 1008, a wake time 1110, a pulse time 1112, a detect time 1114, a quench time 1116, the time-to-oscillation threshold length 1120, the time-to-oscillation length 1122 and the sleep time 1124.

The unblocked cycle timeline illustrates the actions of the intrusion detection device 102 during an exemplary cycle where the laser is unblocked and therefore received by the photodiode 602. The laser pulse function 1000 shows the emission length 812 and magnitude of the laser light pulses over time, as well as the cycle length 814 from emission to emission (32 ms). The quench function 1002 indicates the duration of the logic high level output of the computing device 706 on the quench port 724 over time. The C4 charge function 1004 indicates the change in the charge voltage in capacitor C4 1220 over time. The SRR oscillation function 1006 indicates the duration and magnitude of the oscillations of the SRR 702 over time. The detect function 1008 indicates the time and duration of the signal received by the computing device 706 from the digitizer 704. The functions 1000, 1002, 1004, 1006, 1008 assume that the initialization step has already been completed.

Corresponding to the wake step 902, at the wake time 1110 the microprocessor 710 wakes and outputs the logic high level on quench port 724. The resulting power to the photodiode 602, the preamplifier 700 and the comparator 1270 is indicated by the increase in the quench function 1002 at the wake time 1110. The logic high level also charges capacitor C4 1220, as shown by the linear increase in the C4 function 1004 starting at the wake time 1110.

At the pulse time 1112, corresponding to the emit light 904, the laser pulses are emitted during the emission length 812, as shown on the laser pulse function 1000. As previously described, the pulses are initiated by a command sent by the computing device 706 to the light source 116 via the light source port 726. In the present embodiment, with the clock 714 at 2 MHz, beginning at the pulse time 1112, sixteen pulses of 250 ns each are emitted, with 250 ns between pulses (16×500 ns at a 50% duty cycle). The computing device 706 records the pulse time 1112. It will be understood that the pulse lengths will vary with calibration.

As shown in the SRR oscillation function 1006, beginning at the pulse time 1112 the SRR oscillations, which were not present prior to the pulse time 1112, begin and increase in response to the photodiode 602 receiving the reflected light 110, as described in the preamplify step 908 and the SRR oscillates step 910.

Figure 13:
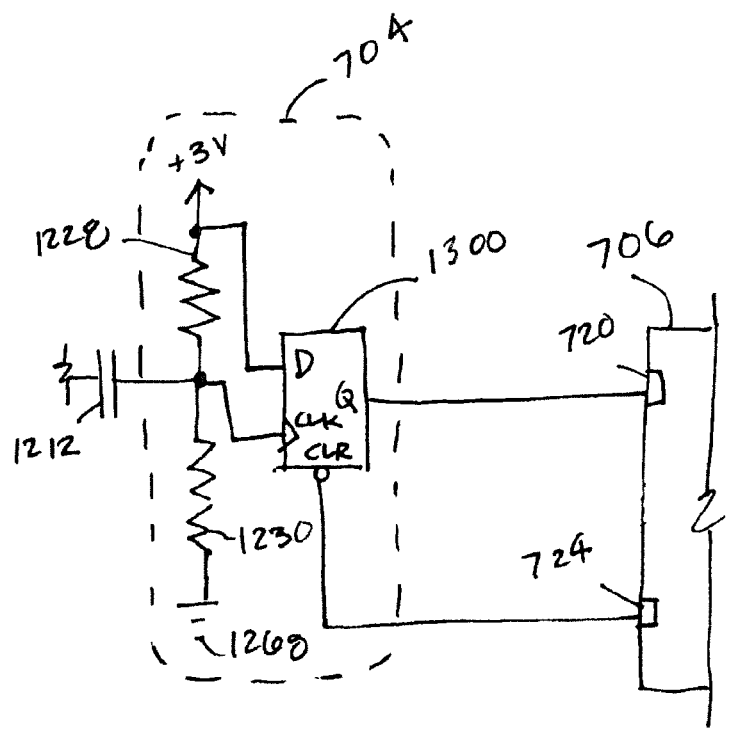
FIG. 13 is a circuit diagram of a digitizer of the circuit diagram of FIG. 12 in another embodiment of the present invention.

The detect time 1114 corresponds to the comparator 1270 determining that the SRR oscillation level first exceeds the oscillation threshold level, corresponding to the oscillation exceeds threshold decision point 914. In response, the detect signal is sent to the computing device 706 as shown by the increase in the detect function 1008 at the detect time 1114. In the exemplary circuit diagram shown below in FIG. 12, the comparator 1270 output changes state each time the sinusoidal SRR oscillating signal crosses the SRR oscillation threshold level. As the sinusoidal SRR oscillating signal varies as shown by the SRR oscillation functions 1006, the resulting detect function 1008 will be the square wave function as shown. It will be understood by those of ordinary skill in the art that other circuit configurations may result in a digitizer 704 output of a single signal at the detect time 1114, as shown in FIG. 13 rather than a square wave function. The computing device 706 also computes the time-to-oscillation length 1122 equal to the time elapsing between the pulse time 1112 and the detect time 1114.

Also in response to the computing device 706 receiving the detect signal on detect port 720 from the comparator 1270, at the quench time 1116 the computing device 706 sends a quench signal to turn power off to the photodiode 602, preamplifier 700, and digitizer 704 and quench the SRR oscillations by discharging C4 1220, as shown on the quench function 1002 as a decrease down to 0 for the quench function 1002. As shown on the SRR oscillation function 1006, after the quench time 1116 the SRR oscillations gradually decrease to 0. The computing device 706 then compares the time-to-oscillation length 1122 with the previously determined time-to-oscillation threshold length 1120. As shown on FIG. 10, the time-to-oscillation length 1122 is less than the time-to-oscillation threshold length 1120, indicating that the light source 116 is unblocked and no alarm is sent. The intrusion detection device 102 enters the sleep period 1124, as previously described in the sleep period step 926. The sleep period 1124 lasts until the next wake time 1110.

Figure 11:
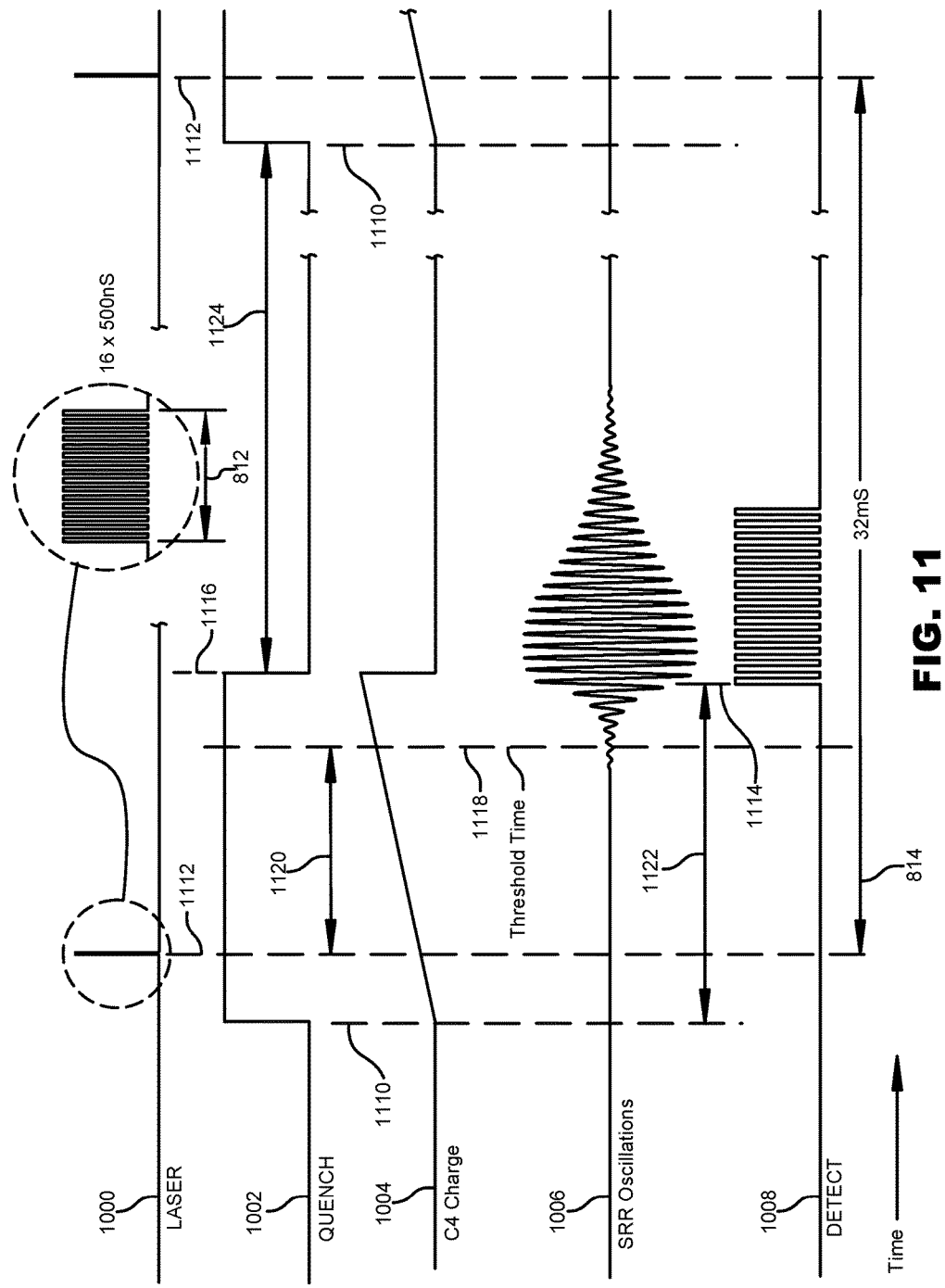
FIG. 11 is a blocked cycle timeline of the method of intrusion detection of FIG. 9.

Referring next to FIG. 11, a blocked cycle timeline is shown for the intrusion detection method of FIG. 9. Shown are the laser pulse function 1000, the quench function 1002, the C4 charge function 1004, the SRR oscillation function 1006, the detect function 1008, the wake time 1110, the pulse time 1112, the detect time 1114, the quench time 1116, the threshold time 1118, the cycle length 814, the time to oscillation threshold length 1120, the time-to-oscillation length 1122, and the sleep period 1124.

The blocked cycle timeline illustrates the actions of the intrusion detection device 102 during an exemplary cycle where the laser emission is blocked by the obstruction 200 and therefore the reflected light 110 is not received by the electrical components module 106.

As in the unblocked cycle of FIG. 10, the computing device 706 wakes and outputs the logic high level on quench port 724. The resulting power to the photodiode 602, the preamplifier 700 and the comparator 1270 is indicated by the increase in the quench function 1002 at the wake time 1110. The logic high level also charges capacitor C4 1220, as shown by the linear increase in the C4 charge function 1004 starting at the wake time 1110.

As in the unblocked cycle of FIG. 10, at the pulse time 1112, corresponding to the emit light pulse 904, the laser light pulses are emitted during the emission length 812, as shown on the laser pulse function 1000.

However, as the photodiode 602 does not receive the reflected light 110 due to the obstruction 200, the SRR 702 begins oscillation late enough such that the time-to-oscillation length 1122 exceeds the time-to-oscillation threshold length 1120. It will be understood that the start time of the SRR oscillations is variable, although it will always be late enough such that the time-to-oscillation threshold length 1120 is exceeded.

After the SRR 702 starts oscillating, the maximum positive oscillation level eventually exceeds the oscillation threshold level during the oscillation exceeds threshold decision point 914. In response, as in FIG. 10, the detect signal is sent to the computing device 706 as shown by the increase in the detect function at the detect time. The computing device 706 also computes the time-to-oscillation length 1122 equal to the time elapsing between the pulse time and the detect time. As shown in FIG. 11, the time-to-oscillation length 1122 is much greater for the blocked cycle.

Also in response to the computing device 706 receiving the signal from the comparator 1270, at the quench time the computing device 706 sends a quench signal to turn power off to the system and quench the SRR oscillations, as shown on the quench function as a decrease down to 0 for the quench function. As shown on the SRR oscillation function 1006, after the quench time 1116 the SRR oscillations gradually decrease to 0. The computing device 706 then compares the time-to-oscillation length 1122 with the previously determined time-to-oscillation threshold length 1120.

As shown on FIG. 11, the time-to-oscillation length 1122 is greater than the time-to-oscillation threshold length 1120, indicating an alarm condition. Proper device operation is verified by subsequently running one "dark" cycle, that is a detection cycle in which the light source 116 is intentionally not pulsed, simulating the blocked condition, and verifying in the dark cycle that the time-to-oscillation length 1122 has not changed. The alarm signal 202 is then output on the alarm port 728 to the alarm module 708. The counter 734 can be incremented to note how long the light source 116 is blocked and how long to keep sending the alarm signal 202.

At the quench time 1116 the intrusion detection device 102 enters the sleep period 1124, as previously described in the sleep period step 926. The sleep period 1124 lasts until the next wake time 1110.

Referring next to FIG. 12, a circuit diagram of a portion of the electrical components of the intrusion detection device 102 is shown. Shown are the preamplifier 700, the superregenerative receiver 702, the digitizer 704, the computing device 706, the photodiode 602, the plurality of input/output ports 720, 722, 724, 726, 728, 730, the switch 732, capacitor C1 1200, capacitor C2 1202, capacitor C3 1204, capacitor C5 1208, capacitor C6 1210, capacitor C7 1212, capacitor C8 1214, capacitor C9 1216, capacitor C10 1218, capacitor C4 1220, resistor R1 1222, resistor R2 1224, resistor R3 1226, resistor R4 1228, resistor R5 1230, resistor R6 1232, resistor R7 1234, resistor R8 1236, resistor R9 1238, resistor R10 1240, resistor R11 1242, inductor L1 1244, inductor L2 1246, inductor L3 1248, inductor L4 1250, inductor L5 1252, transistor Q1 1254, transistor Q2 1256, transistor Q3 1258, transistor Q4 1260, transistor Q5 1262, diode D1 1264, diode D2 1266, a plurality of ground connections 1268, the comparator 1270, a ceramic resonator 1272, a laser diode 1274, capacitor C12 1276, capacitor C13 1278, capacitor C14 1280, capacitor C15 1206, resistor R12 1282, resistor R13 1284, resistor R14 1286, inductor L6 1288, and antenna 1290.

The light source 116 in the embodiment shown is the laser diode 1274. The laser diode 1274 is set to modulate at a computing device clock frequency. The laser diode 1274 is coupled to one end of resistor R11 1242. The opposite end of R11 1242 is coupled to the drain of transistor Q4 1260. The source of transistor Q4 1260 is coupled to one ground connection, whereby R11 1242 is connected to ground. The gate of the transistor Q4 1260 is coupled to the input/output port of the computing device 706. In operation, at the pulse time the computing device 706 first outputs a logic high level on the light source port 726 to turn on transistor Q4 1260 connecting one end of resistor R11 1242 to the ground, resulting in forward biasing of the laser diode 1274. The value of resistor R11 1242 is selected to limit the lasing current of the laser diode 1274. Also at the pulse time, the counter of the computing device 706 starts counting clock 714 cycles to measure the time-to-oscillation length 1122 of the SRR 702. The laser diode 1274 is turned on and off at the frequency of the computing device's clock 714 cycle (approximately 2 MHz in one embodiment) in a minimum cycle burst. As previously described, the light beam 104 from the laser diode 1274 is focused on the retroreflector 112 and reflected back to the electrical components module 106. As previously described, the cover 306 filters out background light below 600 nm and passes red laser light which is then concentrated by the mirrors onto the photodiode 602. The dichroic filter 600 on the photodiode 602 reflects away remaining unwanted light above 600 nm and passed the narrow laser light frequency onto the photodiode 602.

The preamplifier 700 circuit comprises the photodiode 602, inductors L1 1244 and L2 1246, capacitor C1 1200, resistor R1 1222, and transistor Q2 1256. The photodiode 602, as is generally known in the art, converts received light to an electrical current. In the preferred embodiment, the photodiode 602 is low capacitance in order to work at a higher frequency. The anode of the photodiode 602 is coupled to one ground connection via the drain of transistor Q1 1254. The coupling of the photodiode 602 to the ground is active during activity of the laser diode 1274. The source of transistor Q1 1254 is coupled to the ground connection. The Q1 1254 gate is coupled to the quench port 724 of the computing device 706. The cathode of the photodiode 602 is coupled to a base of the transistor Q2 1256 and also to inductor L1 1244. The other end of inductor L1 1244 is connected to the Vcc voltage which reverse biases photodiode 602 and forward biases transistor Q2 1256. Transistor Q2 1256 is configured to amplify a signal received by the photodiode 602. The inductance of L1 1244 is chosen to resonate at the laser diode frequency. The emitter of transistor Q2 1256 is coupled the ground connection via capacitor C2 1202. Emitter resistor R1 1222 is interposed between the photodiode-Q1 connection and the Q2-C2 connection. Emitter resistor R1 1222 is configured to determine the DC bias current and gain of transistor Q2 1256. Capacitor C2 1202 is configured to allow the high frequency signal received by the photodiode 602 from the laser diode 1274 to bypass the resistor R1 1222, thereby increasing the AC gain. The signal appears at the collector of transistor Q2, which is coupled to an LC tank comprising capacitor C1 1200 and inductor L2 1246. The LC tank is tuned to resonate at the laser diode frequency by the DAC port 722. Capacitor C3 1204 is interposed between the collector of transistor Q2 and a base of transistor Q3 1258. Capacitor C3 1204 couples the amplified signal to the base of transistor Q3 1258. Transistor Q3 1258 is part of the superregenerative receiver 702.

An advantage of this preamplifier configuration is the that the reverse biased photodiode 602 has the full Vcc voltage across it, which minimizes parasitic capacitance of the photodiode 602 and improves electron carrier mobility across the PN junction of the photodiode 602. Additional advantages include minimal components that generate noise, high impedance input, separate filtering on the base, emitter and collector, and high potential voltage gain in transistor Q2 1256.

The superregenerative receiver 702 comprises transistor Q3 1258, inductors L3 1248 and L4 1250, resistor R3 1226, capacitors C5 1208, C6 1210 and C4 1220, and diode D2 1266. Transistor Q3 1258 is configured as a Colpitt's oscillator, although other types of oscillators with positive feedback, e.g. Hartley, Clapp, etc. may be used. In some embodiments a crystal or ceramic resonator may be incorporated in to the superregenerative receiver 702 to minimize frequency drift. The collector of transistor Q3 1258 is coupled to the series of capacitors C5 1208, C6 1210, diode D2 1266, and, at the end of the series, the ground connection. The Q3 1258 collector is tuned to oscillate at the frequency of the laser diode 1274 by inductor L3 1248 (also coupled to the Q3 1258 collector) and capacitors C5 1208 and C6 1210 and the variable capacitance of diode D2 1266. The emitter of Q3 1258 is coupled to capacitor C5 1208. The emitter of Q3 1258 is also coupled to inductor L4 1250, which is in turn coupled to the ground connection. The connection between the Q3 1258 collector, capacitor C5 1208, and the Q3 1258 emitter provides positive feedback for oscillation. The base of transistor Q3 1258 is coupled to resistor R3 1226, capacitor C4 1220, and the ground connection, in series. As a result, the Q3 1258 base is slowly biased on through resistor R3 1226 by the slowly charging capacitor C4 1220. The laser diode 1274 pulses are timed to stimulate transistor Q3 1258 to oscillate before the time-to-oscillation threshold length 1120 selected during initialization is exceeded. Capacitor C7 1212 connects the Q3 1258 collector to the digitizer 704 circuit, whereby capacitor C7 1212 couples the oscillation of the collector of Q3 1258 to the non-inverting input of the comparator 1270 of the digitizer 704 circuit. Additionally, resistor R8 1236 is coupled to the tune/DAC port 722 at an end proximate to the computing device 706, and to the diode D2 1266 and capacitor C6 1210 at an end distal to the computing device 706. Capacitor C8 1214 is coupled to the proximate end of resistor R8 1236. Resistor R8 1236 and capacitor C8 1214 filter any noise from the DAC port 722.

The digitizer 704 in the embodiment of FIG. 12 comprises resistors R4 1228, R5 1230, R6 1232 and R7 1234, and the comparator 1270. An alternative digitizer embodiment is shown below in FIG. 13. Resistors R4 1228 and R5 1230 are coupled to an inverting input of the comparator 1270 and form a voltage divider to set the DC threshold voltage on the inverting input of the comparator 1270 at approximately Vcc/2, with Vcc equal to +3v as shown in the embodiment of FIG. 12. Resistors R6 1232 and R7 1234 are coupled to the non-inverting input of the comparator 1270 and form another voltage divider to set the DC voltage on the non-inverting input of the comparator 1270 to approximately 0.5 v below the inverting input, resulting in a digital low output (0) from the comparator 1270. The output of the comparator 1270 is coupled to the detect port 720 of the computing device 706. Resistors R7 1234 and R5 1230 are coupled to the ground connection. When the oscillations from the collector of transistor Q3 1258 increase above 1.0 v peak-to-peak the non-inverting input will exceed the inverting input threshold level, whereby the output of the comparator 1270 will switch to digitally high (1). When the comparator 1270 output changes from low to high, the computing device 706 is configured to stop the counter and the value of the counter is the time-to-oscillation length 1122. The time-to-oscillation length 1122 is then compared to the time-to-oscillation threshold length 1120 as previously described. Additionally, the time-to-oscillation length 1122 for the present cycle is averaged with time-to-oscillation lengths from a certain number of previous cycles and the average time-to-oscillation length is compared to the last calibration value. If the average time-to-oscillation length has changed significantly (i.e. the difference is above a set level), a calibration routine, described in detail below, is run.

The quench output port 724 of the computing device 706 is coupled to transistor Q1 1254, as previously described. After the computing device 706 stops the counter 734, the computing device 706 is configured to output the logic low quench signal via the port 724 coupled to transistor Q1 1254, whereby transistor Q1 1254 is turned off and power is removed from the photodiode 602, the preamplifier 700, and the comparator 1270. Diode DI 1264 is coupled in series between resistor R3 1226 (and thus to the base of transistor Q3 1258) and the quench port 724. Resistor R2 is arranged in parallel with diode D1 1264. The quench signal also causes diode D1 1264 to discharge capacitor C4 1220 and bias transistor Q3 1258 off, thereby quenching the oscillations of the superregenerative receiver 702 in advance of the next cycle.

Exemplary alarm circuitry comprising the alarm module 708 is coupled to the alarm port 730 of the computing device 706. Resistor R9 1238 is coupled to the alarm port 730. The distal end of resistor R9 1238 is coupled to capacitor C13 1278, which is grounded. Resistor R10 1240 is also coupled to the alarm port 730. The distal end of R10 1240 is coupled to the base of transistor Q5 1262 and capacitor C9 1216. The distal end of C9 1216 is coupled to the ceramic resonator 1272. The collector of Q5 1262 is coupled to resistor R12 1282. The distal end of R12 1282 is coupled to capacitor C12 1276 and inductor L5 1252. The emitter of Q5 1262 is coupled to capacitor C10 1218 and resistor R14 1286. Resistor R13 1284 is interposed between the proximate end of R14 1286 and the distal end of capacitor C12 1276. The distal end of inductor L5 1252 is coupled to capacitor C15 1206 and the antenna 1290. Inductor L6 1288 is interposed between the L5 1252-C15 1206 connection and the R9 1238-C13 1278 connection. Capacitor C14 1280 is coupled to the distal end of antenna 1290.

When an alarm mode is triggered the computing device 706 outputs an alarm code as serial data on alarm port 730. The alarm module 708 in the embodiment shown is an on-off keyed (OOK) surface acoustic wave (SAW) stabilized transmitter. The serial data from alarm port 730 turns on the transmitter when the data is high and off when the data is low.

Alarm port 730 can be used to energize a relay, trigger a camera, send an audible tone to a speaker, or output a serial data code to control a wireless transmitter. The wireless transmitter embodiment, as shown in the embodiment of FIG. 12, may be advantageous when the device is installed in a remote location. The exemplary alarm of FIG. 12 is based on a remote-control transmitter for 433.92 MHz as disclosed in Principles of SAWR stabilized oscillators by EPCOS (2001). A data code transmitted by the wireless transmitter would be sent in a format acceptable to a security system control device configured to receive such information. It will be understood by those of ordinary skill in the art that alternate circuitry or modules may be coupled to the alarm port and be configured to send alarms or other signals in response to receiving an indication from the computing device 706.

It will be understood that the alarm circuitry shown in FIG. 12 is one exemplary embodiment and any type of alarm circuitry suitable for receiving the alarm port 730 signal and transmitting the alarm signal 202 may be used.

Referring again to FIG. 12, the photodiode 602 is used to convert the modulated light in the electrical signal that stimulates the SRR 702 into oscillation. Because the photodiode 602 appears as a capacitor when reverse biased, the photodiode 602 can form part of the LC resonance value of the preamplifier 700 of the oscillating circuit of the SRR 702 as shown in one embodiment.

The preamplifier 700 in the present embodiment is a high input impedance common emitter preamplifier. In the intrusion detection system 100 of the present invention, the photodiode 602 is exposed to a lot of background light, thus it is desirable to use inductor L1 1244 of the preamplifier 700, to passively filter out the DC current from the photodiode signal before the DC noise is amplified. The high impedance preamplifier 700 prevents loading down the remaining photodiode AC signal voltage on inductor L1 1244. The preamplifier 700 and the SRR 702 may include BJT or JFET transistors.

The transistors Q2 1256 and Q3 1258 for the preamplifier 700 and the SRR 702 in the preferred embodiment have low noise and low junction capacitance. Examples of suitable transistors include JFET and bipolar transistors designed for wideband low noise amplifiers. In short range (and less expensive) embodiments, more generic transistors such as those used in SRR radio receivers may be used.

In the present embodiment, the combination of the preamplifier 700 and the superregenerative receiver 702 include the capacitor C1 1200 and inductors L2 1246 and L4 1250. In some embodiments capacitor C1 1200 is removed and inductors L2 1246 and L4 1250 are replaced by resistors in order to lower the Q factor and prevent tuning from being overly sharp.

In some embodiments the SRR 702 may include an optional SAW resonator, as disclosed in U.S. Pat. No. 4,749,964. Including the SAW resonator would stabilize the SRR frequency and reduce the tuning burden such that the computing device 706 requires fewer peripherals. In some embodiments tuning would not be required and the tuning circuitry may be eliminated.

Any additional intrusion detection devices that are operated in parallel can be checked for simultaneous blockage to determine if one obstruction 200 is blocking multiple intrusion detection devices. It is often desirable to use two or more devices together, spaced so that an alarm would only be triggered if all devices are blocked simultaneously. This would prevent false alarms from smaller objects such as leaves, birds or pets which would block a single beam.

If, during the time-to-oscillation comparison decision point 922, the time-to-oscillation length 1122 is found to have changed significantly from the last calibration value, the clock 714 and SRR tuning DAC 716 are adjusted using successive approximation to approach and match the laser transmit and SRR receive frequencies (for example, using a process similar to the calibration process described below in FIG. 14). The approximation attempts can be spread out over normal cycles so as to minimize the time between intruder detect cycles. The shortest time-to-oscillation length obtained from the calibration process is compared to the previously determined time-to-oscillation length 1122 to determine any change in beam strength over time due to factors such as optical impairment, noise, laser brightness, weather visibility, a dirty cover, number of laser pulses, temperature of transistor Q3 1258, etc. The difference in time-to-oscillation length 1122 between light and dark cycles is compared to update the time-to-oscillation threshold length 1120 to midway from the time-to-oscillation length 1122 for an unblocked cycle and the time-to-oscillation length 1122 for a blocked cycle. The dark cycle can also be randomly inserted during normal operation to prevent external light tampering by an intruder using a continuously modulated laser.

Referring next to FIG. 13, a circuit diagram of the digitizer 704 in a second embodiment is shown. The comparator 1270 is replaced with a 'ID' type flip-flop 74LVC1G74. Shown are the digitizer 704, the computing device 706, the detect port 720, the quench port 724, capacitor C7 1212, resistor R4 1228, resistor R5 1230, ground 1268, and flip-flop 1300.

In the alternative digitizer 704 configuration, capacitor C7 1212 leading into the digitizer circuit is coupled to resistor R4 1228 and resistor R5 1230. Resistor R5 1230 is grounded, while R4 is coupled to a data input of the flip-flop 1300. The R4-R5-C7 junction is coupled to a clock input of the flip-flop 1300. A clear input of the flip-flop 1300 is coupled to the quench port 724 of the computing device 706. A Q output of the flip-flop 1300 is coupled to the detect port 720. R4 1228 and R5 1230 form a DC voltage divider so that the clock input of the flip-flop 1300 is 0.5 v below a valid logic high for the flip-flop 1300. The data ("D") input of the flip-flop 1300 is connected to Vcc.

In operation, during the sleep period, the quench function 1002 is low and the flip-flop 1300 is cleared setting the Q output to a low level and the detect port input. When the device 102 wakes from the sleep period the quench function 1002 goes high and the flip-flop 1300 is no longer cleared. Next the SRR 702 will start to oscillate and when the oscillations increase above 1 volt p-p the clock input of the flip-flop 1300 will trigger the high level on the data input to be transferred to the Q output and received by the detect port 720. The computing device 706 processes the detect signal in the same manner as in the case of the comparator digitizer 704. The flip-flop 1300 only goes high once per detection cycle whereas the comparator digitizer 704 goes high and then low every 500 ns until the SRR oscillations are quenched. The advantage of the flip-flop 1300 is lower power and lower cost. The disadvantage is the SRR oscillation frequency cannot be directly measured for calibration purposes.

Figure 14:
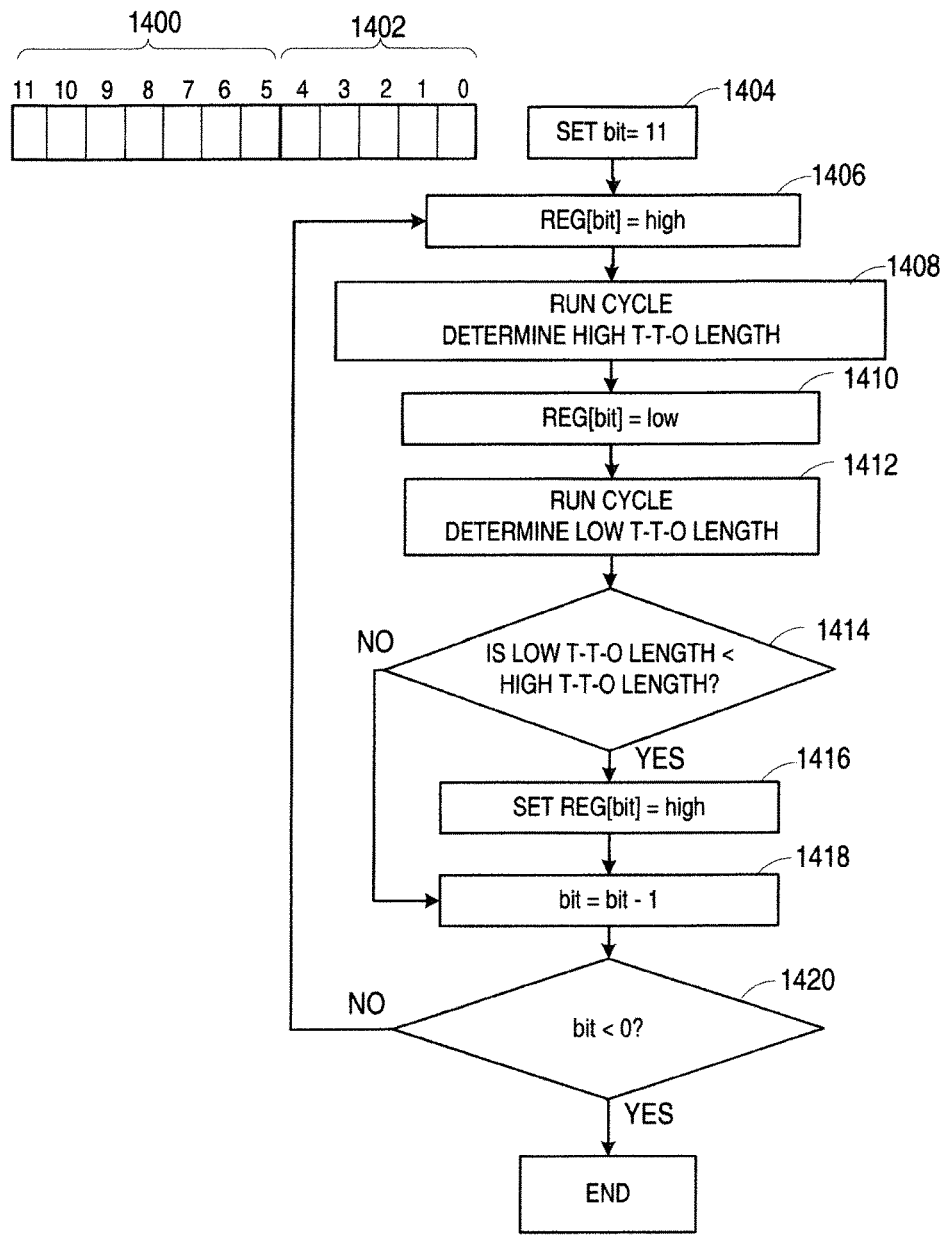
FIG. 14 is a flowchart diagram of an exemplary calibration process of the intrusion detection device in another embodiment of the present invention.

Referring next to FIG. 14, an exemplary successive approximation process for calibration of the clock 714 is shown in one embodiment of the present invention. Shown are a clock register 1400, a DAC register 1402, a set bit 11 step 1404, a set current bit high step 1406, a run cycle on high step 1408, a set current bit low step 1410, a run cycle on low step 1412, an obtain low time-to-oscillation length step 1414, a time-to-oscillation comparison decision point 1416, a next bit step 1418, and an end process decision point 1420.

In one embodiment, the clock 714 is calibrated to result in the shortest time-to-oscillation length 1122 using the following algorithm. In the exemplary process, the clock register 1400 comprises 7 bits (numbered 5-11, with 11 being the most significant bit.) and the DAC register 1402 comprises 5 bits (numbered 0-4, with 0 being the least significant bit.). Initially, all bits are set low (i.e. equal to 0). Coarse tuning is done by the clock register 1400 which changes the light source modulation frequency. Fine tuning is done by the DAC register which changes the SRR oscillation frequency.

In the present embodiment, setting bit 0 as high is equal to adding approximately 250 Hz to the base frequency and setting each subsequent adjacent bit is equal to double the previous bit, i.e. bit 1 adds 500 Hz, bit 2 adds 1 kHz, up to bit 11 adds 512 kHz. It will be understood that other frequency ranges and register sizes may be used.

In the first set bit 11 high step 1404, a current bit is set to the most significant bit, in this case bit 11. In the next set current bit high step 1406, the current bit (initially bit 11) is set high. The process then proceeds to the run cycle on high step 1408.

In the next run cycle on high step 1408, the device 102 runs the detection cycle and obtains a high time-to-oscillation length, i.e. the time-to-oscillation length 122 with the current bit set as high.

In the next set current bit low step 1410, the current bit is changed to low. The detection cycle is then re-run in the next run cycle on low step 1412, and a low time-to-oscillation length is obtained (the time-to-oscillation length 122 with the current bit set as low).

Proceeding to the time-to-oscillation comparison decision point 1414, the low time-to-oscillation length is compared to the high time-to-oscillation length. If the low time-to-oscillation length is shorter, the current bit remains low and the process proceeds to the next bit step 1418. If the high time-to-oscillation length is shorter than the low time-to-oscillation length, the process proceeds to the set bit high step 1416, where the current bit is set high. The process them proceeds to the next bit step 1418.

In the next bit step 1418, the current bit is set equal to bit-1, i.e. the next smaller bit. The process proceeds to the end process decision point 1420. In the end process decision point 1420, if the current bit is equal to a negative number (i.e. all of the bits 0-11 have been set through the process), the process ends and the current register settings are used. If the current bit is 0 or higher, the process then returns to the run cycle on high step 1408 with the current bit. In this way all of the register bits are set to produce the shortest time-to-oscillation length 1122.

It will be understood that the calibration process may use an alternate algorithm and/or implement additional techniques such as frequency sweep, lookup tables and frequency measurement.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. An intrusion detection device comprising:
   a light source for projecting a light beam across a distance, wherein the light source is periodically modulated at a frequency; and
   a receiver comprising:
      an optical transducer; and
      a superregenerative receiver coupled to the optical transducer and configured to periodically oscillate at the frequency the light source is modulated at, whereby reception of the light beam by the optical transducer will influence the superregenerative receiver to oscillate sooner than if the light beam is not received.

2. The intrusion detection device of claim 1, the receiver further comprising a preamplifier configured to receive a signal from the optical transducer and output an amplified signal to the superregenerative receiver.

3. The intrusion detection device of claim 1, the receiver further comprising a digitizer configured to receive an oscillated signal from the superregenerative receiver and in response output a digital signal.

4. The intrusion detection device of claim 3, further comprising: a housing; a computing device housed in the housing, the computing device including a processor, a memory coupled to the processor, software stored on the memory and configured to run on the computing device, and a clock.

5. The intrusion detection device of claim 4, wherein the computing device is configured to receive an indication that the superregenerative receiver is oscillating and to determine whether a time lapse between modulation of the light source and receiving the indication exceeds a time the modulated light beam can influence oscillation of the superregenerative receiver, wherein an indication of an alarm is output by the computing device in response to the modulated light beam not being received.

6. The intrusion detection device of claim 5, further comprising a signal coupling the computing device to the receiver whereby at least one component of the receiver is turned on and off.

7. The intrusion detection device of claim 5, further comprising an alarm module coupled to the computing device and configured to output an alarm signal in response to receiving the indication of the alarm.

8. The intrusion detection device of claim 5, further comprising a connection to a wireless network coupled to the computing device and configured to communicate an alarm condition and other information to and from the wireless network.

9. The intrusion detection device of claim 8, further comprising a camera coupled to the computing device configured to record images during alarm conditions and normal conditions as requested and transmit them over the wireless network.

10. The intrusion detection device of claim 4, the computing device further configured to output a signal to the superregenerative receiver, whereby oscillations of the superregenerative receiver are reduced to zero.

11. The intrusion detection device of claim 4, the computing device further configured to perform an initial calibration routine to adjust at least one of a frequency of the superregenerative receiver and a modulation frequency of the light source until they are the same.

12. The intrusion detection device of claim 4, the computing device further configured to determine if a time-to-oscillation length is within a normal range, and upon determining that the time-to-oscillation length is outside the normal range, tuning at least one of a frequency of the superregenerative receiver and a modulation frequency of the light source.

13. The intrusion detection device of claim 1, wherein the light beam is reflected from the light source to the optical transducer.

14. An intrusion detection device comprising:
   a light source for projecting a light beam across a distance; and a receiver to detect the light beam comprising: an optical transducer, and a compound mirror configured to direct the light beam to the optical transducer.

15. An intrusion detection device comprising:
   a light source for projecting a light beam across a distance; and a receiver to detect the light beam, the receiver further comprising at least one optical filter that is a dichroic filter to pass only light of approximately the same wavelength as the light source.

16. An intrusion detection device comprising:
   a light source for projecting a light beam across a distance; and a receiver to detect the light beam, wherein the light source is a visible laser and is configured to operate in at least two user-selectable modes, a first intrusion detection mode wherein the light source is on for a fraction of the time, wherein the average intensity of the light source is no greater than a microwatt, whereby the light source is not easily seen, and a second alignment mode wherein the light source is functioning as a highly visible laser pointer to aid in alignment of the light source with the receiver.

* * * * *